(12) United States Patent
Haque et al.

(10) Patent No.: US 12,107,711 B2
(45) Date of Patent: Oct. 1, 2024

(54) METHOD AND APPARATUS FOR ADAPTIVE INDIRECT CARRIER MODULATION

(71) Applicant: InterDigital Patent Holdings, Inc., Wilmington, DE (US)

(72) Inventors: Tanbir Haque, Jackson Heights, NY (US); Hussain Elkotby, Conshohocken, PA (US); Patrick Cabrol, Bayshore, NY (US); Ravikumar Pragada, Warrington, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 91 days.

(21) Appl. No.: 17/795,474

(22) PCT Filed: Jan. 22, 2021

(86) PCT No.: PCT/US2021/014660
§ 371 (c)(1),
(2) Date: Jul. 26, 2022

(87) PCT Pub. No.: WO2021/154607
PCT Pub. Date: Aug. 5, 2021

(65) Prior Publication Data
US 2023/0078737 A1     Mar. 16, 2023

Related U.S. Application Data

(60) Provisional application No. 62/967,732, filed on Jan. 30, 2020, provisional application No. 63/051,022, filed on Jul. 13, 2020.

(51) Int. Cl.
*H04L 27/00* (2006.01)
*H04B 5/77* (2024.01)
(Continued)

(52) U.S. Cl.
CPC ........... *H04L 27/0008* (2013.01); *H04B 5/77* (2024.01); *H04B 5/79* (2024.01); *H04B 17/327* (2015.01)

(58) Field of Classification Search
CPC ... G06K 7/00; G06K 7/10; H02J 50/00; H02J 50/20; H04B 1/04; H04B 1/59;
(Continued)

(56) References Cited

U.S. PATENT DOCUMENTS 9,312,950 B1     4/2016 Deyle
10,848,239 B2 *  11/2020 Kim .................... H04B 7/22
(Continued)

FOREIGN PATENT DOCUMENTS

CN     109413731 A     3/2019

OTHER PUBLICATIONS

English Translation for CN109413731A, entitled: Information transmission method and information receiving method of wireless energy supply, 20 pages.
(Continued)

*Primary Examiner* — Shawkat M Ali
(74) *Attorney, Agent, or Firm* — VOLPE KOENIG

(57) ABSTRACT

A wireless transmit/receive unit, WTRU, can select a constellation from a set of constellations corresponding to a symbol configuration for indirect carrier modulation, ICM, based on at least one constellation performance efficacy indicator, each constellation performance efficacy indicator respectively corresponding to a constellation of the set of constellations, and use the selected constellation and symbol configuration to simultaneously harvest energy and transmit data.

20 Claims, 21 Drawing Sheets

(51) Int. Cl.
  *H04B 5/79* (2024.01)
  *H04B 17/327* (2015.01)
(58) Field of Classification Search
  CPC ... H04B 5/00; H04B 5/77; H04B 5/79; H04B 17/327; H04L 27/00; H04L 27/26; H04L 27/34; H04L 27/0008; H04W 4/00; H04W 52/02; H04W 72/04; H04W 76/28; H04W 84/12
  USPC ............... 375/219, 260, 262, 267, 295, 316
  See application file for complete search history.

(56) References Cited

U.S. PATENT DOCUMENTS

| | | | |
|---|---|---|---|
| 11,888,608 B2* | 1/2024 | Wu | ............................ H04L 1/00 |
| 2019/0020524 A1* | 1/2019 | Finkelstein | ........... H04L 1/0005 |
| 2019/0089571 A1 | 3/2019 | Von et al. | |

OTHER PUBLICATIONS

Darsena et al., "Resource Allocation for Sensors with Wireless Power Transfer and Ambient Backscatter Transmission", Institute of Electrical and Electronics Engineers, 2017 International Symposium on Wireless Communication Systems (ISWCS), Bologna, Italy, Aug. 28, 2017, 6 pages.

Anonymous, Part 11: Wireless LAN Medium Access Control (MAC) and Physical Layer (PHY) Specifications, Institute of Electrical and Electronics Engineers, IEEE Standard for Local and Metropolitan Area Networks, Document: IEEE Standard 802.11, Jun. 26, 1997, 459 pages.

Liu et al., "SWIPT with Practical Modulation and RF Energy Harvesting Sensitivity", Institute of Electrical and Electronics Engineers, 2016 IEEE International Conference on Communications (ICC), Kuala Lumpur, Malaysia, May 22, 2016, 7 pages.

Memon et al., "Backscatter Communications: Inception of the Battery-Free Era—A Comprehensive Survey", MDPI, Electronics 2019, 8, 129, published Jan. 26, 2019, 69 pages. https://www.mdpi.com/2079-9292/8/2/129.

Anonymous, "Part 16: Air Interface for Fixed Broadband Wireless Access Systems", IEEE Computer Society and the IEEE Microwave Theory and Techniques Society, IEEE Standard for Local and Metropolitan Area Networks, Document: IEEE Std 802.16-2004, Oct. 1, 2004, 893 pages.

Anonymous, "Part 15.1: Wireless Medium Access Control (MAC) and Physical Layer (PHY) Specifications for Wireless Personal Area Networks (WPANS)", IEEE Standard for Wireless MAC and PHY, Document: IEEE STD 802.15.1-2002, Jun. 14, 2002, 5 pages.

Anonymous, "EPC Radio-Frequency Identity Protocols Generation-2 UHF RFID", GSI EPCglobal, Inc., Specifications for RFID Air Interface, Protocols for Communication at 860MHz-960MHz, EPCglobal Gen2 Specification, Version 2.0.1, Apr. 2015.

Bayguzina et al., "Asymmetric Modulation Design for Wireless Information and Power Transfer With Nonlinear Energy Harvesting", IEEE Transactions on Wireless Communications, vol. 18, Issue 12, Dec. 2019, 14 pages.

Kim et al., "Novel Sparse-Coded Ambient Backscatter Communication for Massive loT Connectivity", Energies 2018, vol. 11, No. 7, 1780, 25 pages. https://doi.org/10.3390/en11071780.

Boyer et al., "Coded QAM Backscatter Modulation for RFID", Institute of Electrical and Electronics Engineers, IEEE Transactions on Communications, vol. 60, Issue 7, Jul. 2012, 10 pages.

Andrawes et al., "Energy harvesting with cooperative networks and adaptative transmission", 2017 IEEE Jordan Conference on Applied Electrical Engineering and computing Technologies (AEECT), pp. 1-6 (Oct. 2017).

* cited by examiner

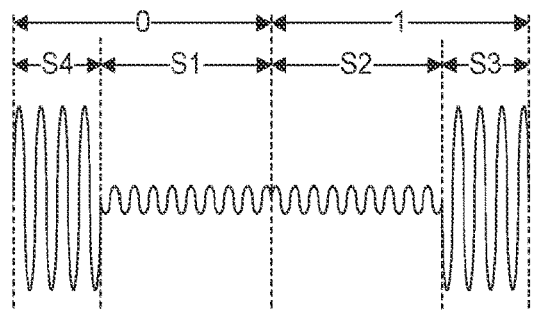
Figure 7A
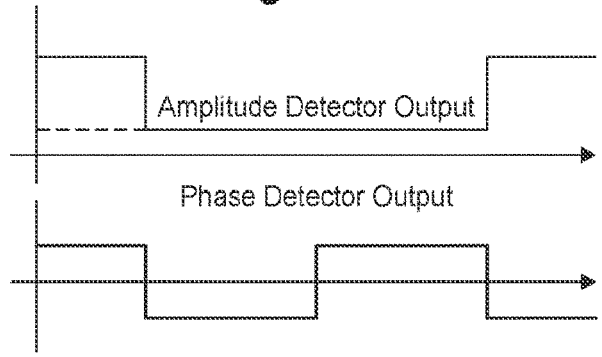
Figure 7B
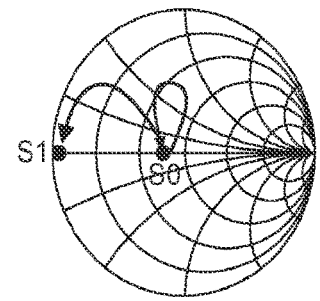
Figure 8A
Figure 8B
Figure 8C

| Data Symbol | Code | | | |
|---|---|---|---|---|
| 00 | 0 | 0 | 0 | ↑↓ |
| 01 | 0 | 0 | ↑↓ | 0 |
| 10 | 0 | ↑↓ | 0 | 0 |
| 11 | ↑↓ | 0 | 0 | 0 |

| Symbol | Code | Waveform & ICM State |
|---|---|---|
| 00 | 0 0 0 ↑↓ | S0 / S0 / S0 / S1→S2 |
| 01 | 0 0 ↑↓ 0 | S0 / S0 / S1→S2 / S0 |
| 10 | 0 ↑↓ 0 0 | S0 / S1→S2 / S0 / S0 |
| 11 | ↑↓ 0 0 0 | S1→S2 / S0 / S0 / S0 |

| Data Symbol | Code | | | |
|---|---|---|---|---|
| 00 | 0 | 0 | 0 | 1 |
| 01 | 0 | 0 | 1 | 0 |
| 10 | 0 | 1 | 0 | 0 |
| 11 | 1 | 0 | 0 | 0 |

| Data Symbol | Code | | | | |
|---|---|---|---|---|---|
| 00 | 0 | 0 | 0 | 1 | 1 |
| 01 | 0 | 0 | 1 | 1 | 0 |
| 10 | 0 | 1 | 1 | 0 | 0 |
| 11 | 1 | 1 | 0 | 0 | 0 |

| Data Symbol | Code | | | |
|---|---|---|---|---|
| 00 | 1 | 1 | 1 | 0 |
| 01 | 1 | 1 | 0 | 1 |
| 10 | 1 | 0 | 1 | 1 |
| 11 | 0 | 1 | 1 | 1 |

| Symbol | Code | Waveform & ICM State |
|---|---|---|
| 00 | 1 1 1 0 | S1 S1 S1 S0 |
| 01 | 1 1 0 1 | S1 S1 S0 S1 |
| 10 | 1 0 1 1 | S1 S0 S1 S1 |
| 11 | 0 1 1 1 | S0 S1 S1 S1 |

METHOD AND APPARATUS FOR ADAPTIVE INDIRECT CARRIER MODULATION

CROSS REFERENCE TO RELATED APPLICATIONS

This application is a U.S. National Stage Application under 35 U.S.C. 371 of International Patent Application No. PCT/US2021/014660, filed Jan. 22, 2021, which is incorporated herein by reference in its entirety.

This application claims the benefit of U.S. Application Nos. 62/967,732, filed Jan. 30, 2020; and 63/051,022, filed Jul. 13, 2020.

BACKGROUND

Indirect carrier modulation methods have the potential to enable ultra-low power transmitters that can be deployed in large scale. Existing systems that employ indirect carrier modulation include Near-field communication (NFC) and Radio-frequency identification (RFID).

In RFID, a so-called reader can interact with a plurality of devices ("tags"). The reader provides over-the-air Radio Frequency (RF) power and data to the tags on the downlink (DL). The tags use the RF power provided by the reader to send data back. The tags transmit data by modulating their antenna loads using simple schemes—e.g. On-Off Keying (OOK) and Binary Phase Shift Keying (BPSK)—and reflect the RF carrier transmitted by the reader back to the reader. Passive RFID devices typically use OOK modulation on the uplink, which is well suited for energy harvesting on the downlink, while semi-passive and active devices employ for example BPSK that is well suited for transmitting higher energy per bit in an indirect carrier modulation framework. A particular product supports a single frequency band and communication mode. The reader and all tags communicate over the same frequency channel. Thus, a tag performs power reception on the DL and data transmission on the uplink (UL) simultaneously using the same carrier frequency.

RFID systems use indirect carrier modulation transmission between backscatter coupled devices where the reader and tag are in the far field of each other's antennas. RFID tags can be passive (i.e. without autonomous power source), semi-passive (i.e. with a small battery) or active (i.e. with an autonomous power source, such as a battery). Existing RFID standards specify only one mode of communication. This is referred to as the reader/writer mode where the reader initiates all communication by interrogating the tags. The tags respond only when interrogated by the reader. Existing RFID standards specify several frequency bands, ranging from low frequency (125 kHz) to super-high frequency, SHF (5.8 GHz). RFID communication range can extend up to 100 m.

NFC can be said to be a refined version of RFID. It is used for applications as varied as home automation, consumer electronics and smart meters. NFC systems use indirect carrier modulation transmission between inductively coupled devices where the reader and tag are in the near field of each other's transducers. NFC devices can be passive, semi-passive or active. Existing NFC standards specify a single frequency band, 13.56 MHz, and three modes of communication—"reader/writer", "card emulation" and "peer-to-peer". NFC communication range extends from roughly one centimeter up to one meter.

SUMMARY

A method and apparatus for operation by a wireless transmit/receive unit, WTRU. The WTRU may select a constellation from a set of constellations corresponding to a symbol configuration for indirect carrier modulation, ICM, based on at least one constellation performance efficacy indicator, each constellation performance efficacy indicator respectively corresponding to a constellation of the set of constellations, and use the selected constellation and symbol configuration, simultaneously harvesting energy and transmitting data.

BRIEF DESCRIPTION OF THE DRAWINGS

Furthermore, like reference numerals in the figures indicate like elements, and wherein:

FIGS. 7A and 7B illustrate a decoding scheme for hybrid phase-amplitude indirect carrier modulation transmission according to an embodiment of the present principles;

FIGS. 8A-8C illustrate an example of a sparse block code;

EXAMPLE NETWORKS FOR IMPLEMENTATION OF THE EMBODIMENTS

Figure 1A:
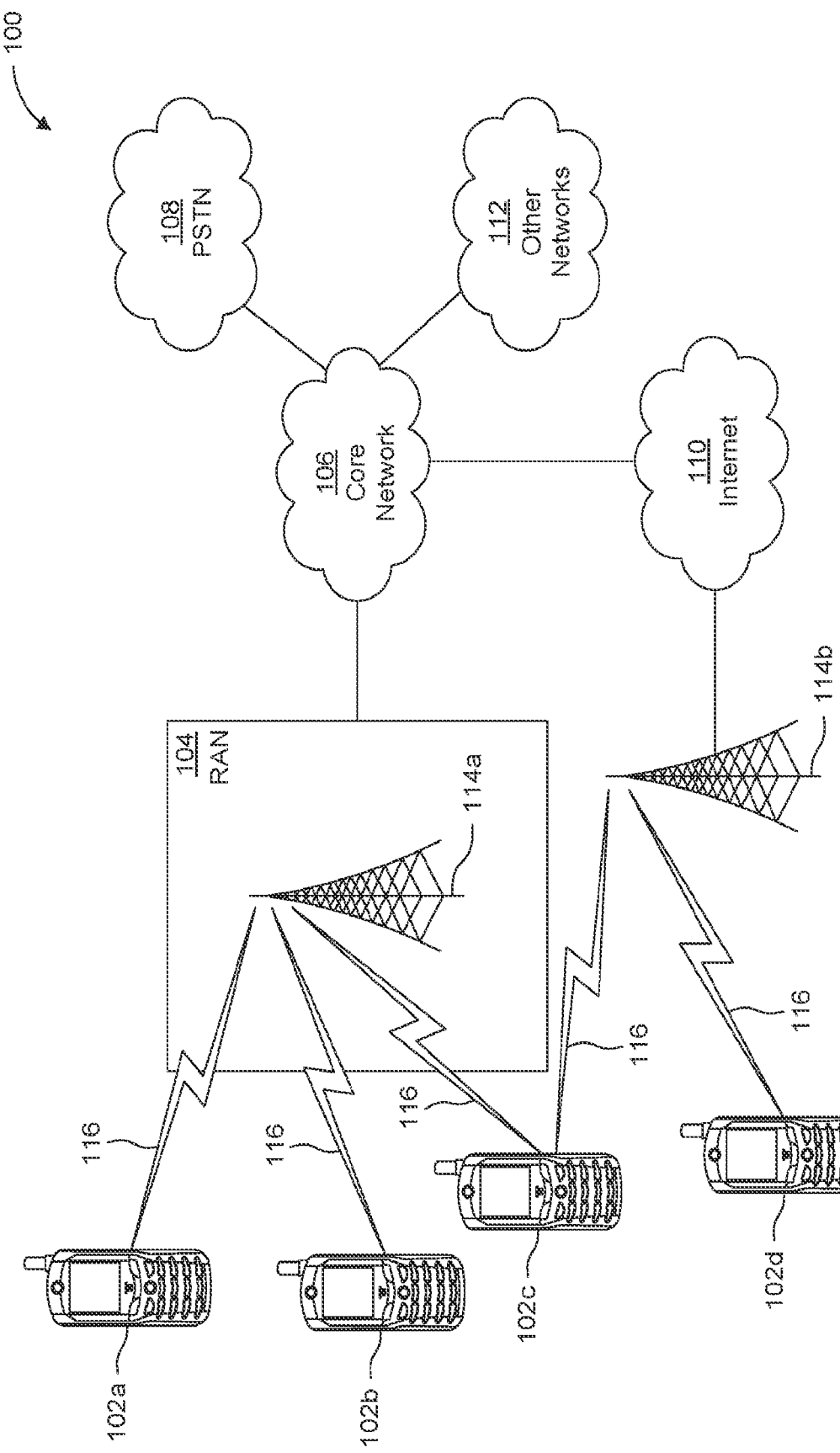
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a in the RAN 104 and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a in the RAN 104 and the WTRUs 102a, 102b, 102c may implement a radio technology such as NR Radio Access, which may establish the air interface 116 using New Radio (NR).

In an embodiment, the base station 114a in the RAN 104 and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communications networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
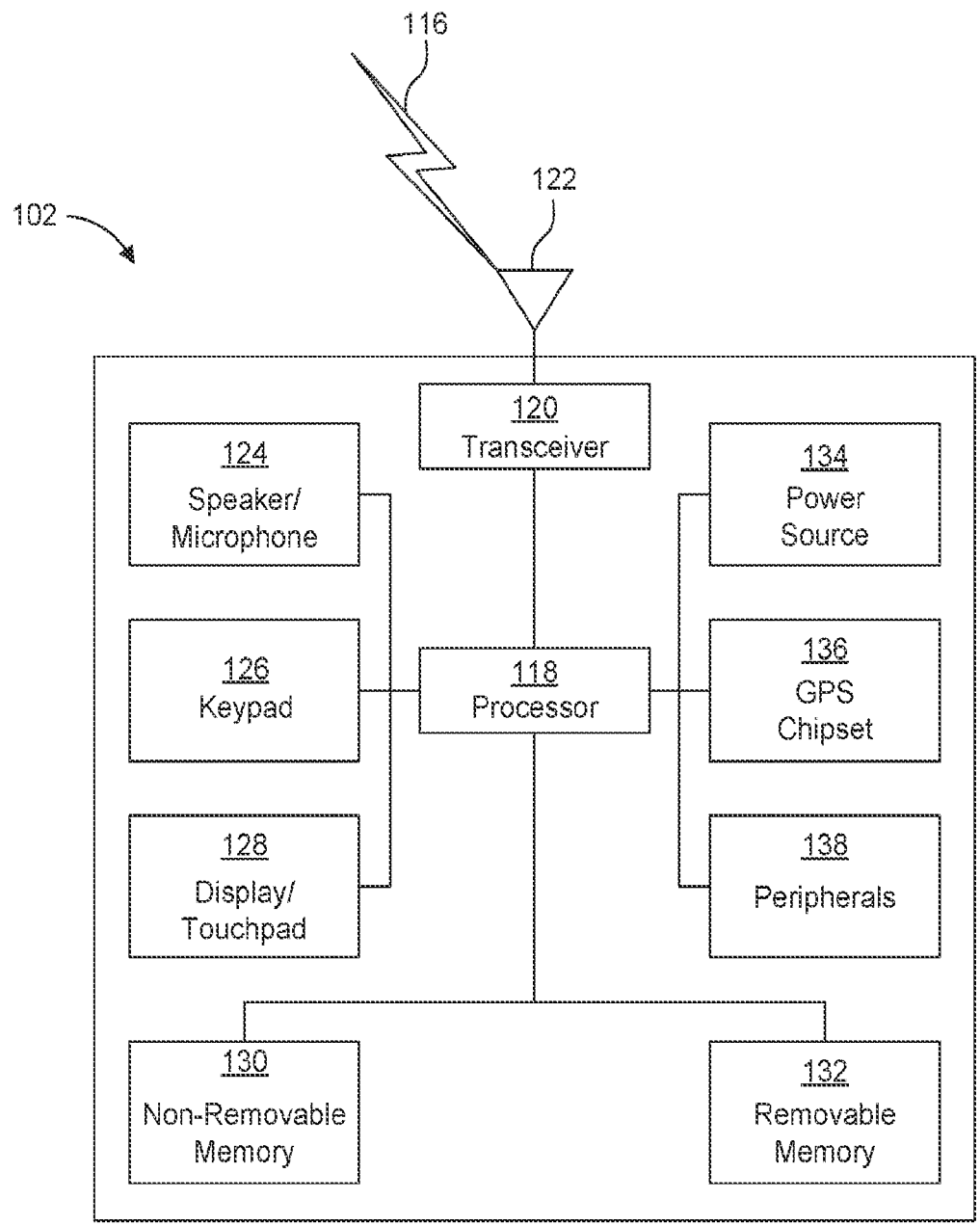
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a chipset 136 for a positioning system such as Global Positioning System (GPS), and/or other elements 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a in FIG. 1A) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements 138, which may include one or more software and/or hardware modules that provide additional features, functionality and/or wired or wireless connectivity. For example, the elements 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The elements 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
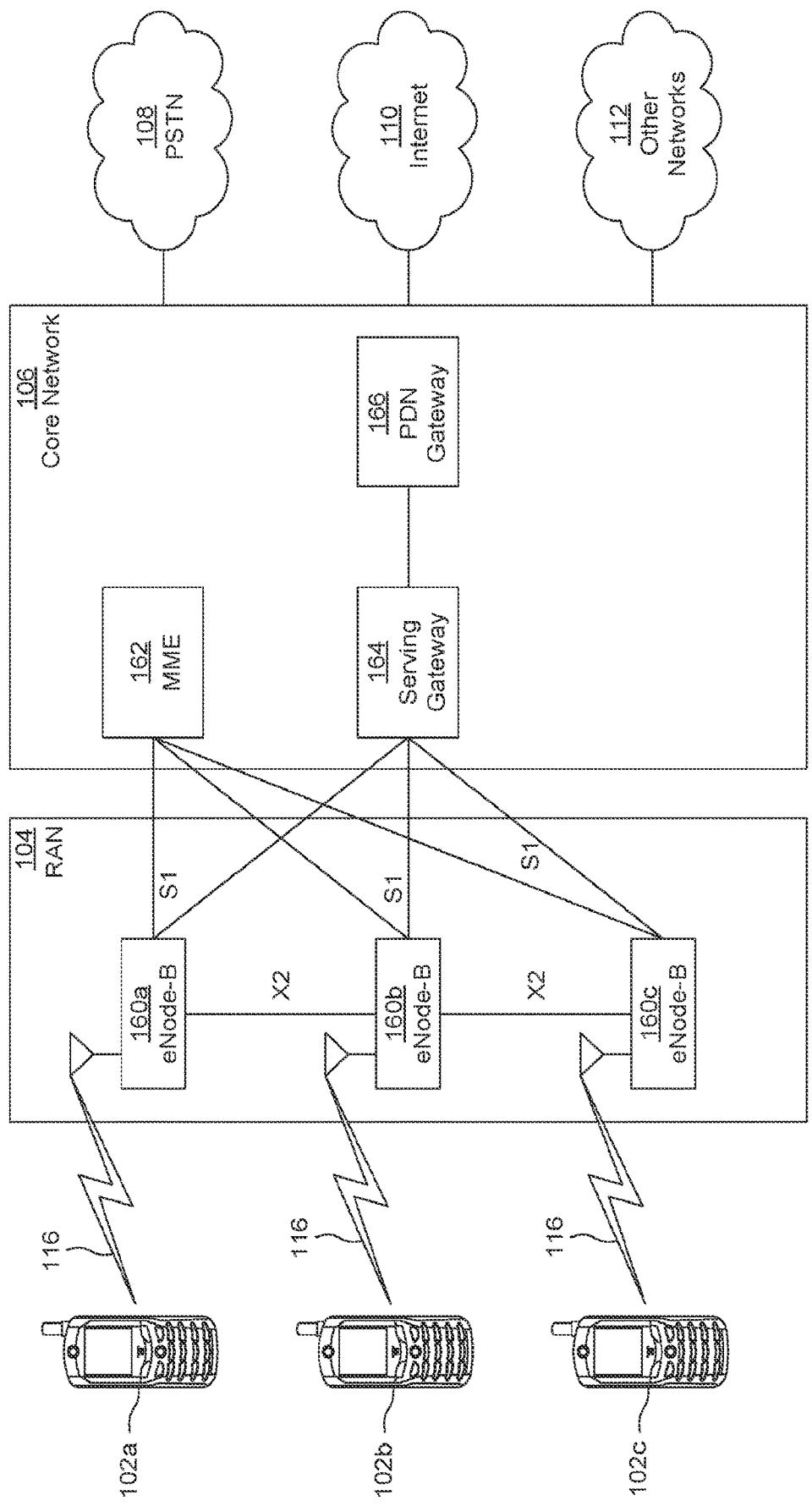
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
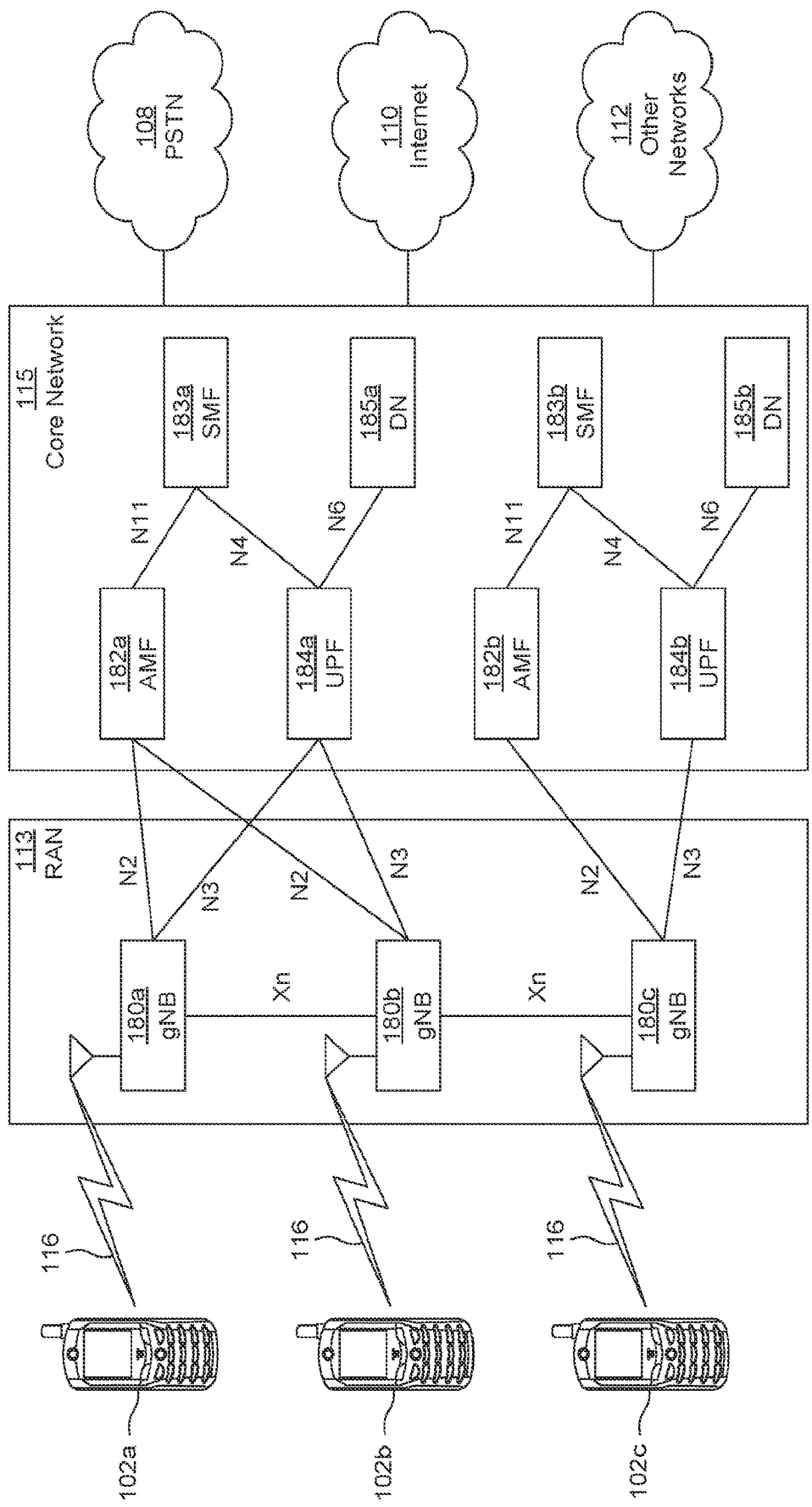
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c in FIG. 1C). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

A key challenge for future cellular communication is the need to support trillions of connected and often mobile devices. While cellular data rates have experienced a tremendous increase over the past three decades (close to 6 orders of magnitude), there has been less than ten times improvement in battery energy density from 1990 to 2015. This presents a major challenge in scaling to one trillion devices. As an example, assuming one trillion deployed devices, each with a 10-year battery life, this would result in an average of 274 million battery changes per day. Furthermore, in some cases, changing the battery will be difficult, if not impossible. Therefore, scaling to one trillion devices could be well served by re-imagining the radio transceiver, the air-interface and the overall system.

Some key advances that could assist this scaling include ultra-low power RF transmitters capable of supporting at least small cell-like link budgets, zero-energy uplink air-interfaces that do not draw power from the device's battery with the goal of enabling "for-ever" batteries in the near term and battery-free operation of devices in the long term, and a scalable system framework that can support a diverse set of deployment scenarios and device types.

An indirect carrier modulation-based backscatter coupled communication framework, used for example in far-field RFID systems, could be helpful when integrating legions of mobile connected devices into mobile communication networks (e.g. future 3GPP and IEEE networks). To this end, ultra-low-power transponders for terminal devices that are capable of communication ranges extending from a few tens of meter to a few hundreds of meters could be useful. These transponders could support multiple modes of operation and be able to adapt dynamically in different operating environments. Such devices could benefit from more sophisticated coded modulation methods (as compared to those currently specified for e.g. RFID systems) while the power consumption and cost are limited. Furthermore, these devices would also benefit from being powered over-the-air by the network.

Somewhat simplified, a transponder using indirect carrier modulation can include an antenna, an indirect carrier modulator (ICM) with a programmable antenna load and a load modulator, a memory module to store a payload, an energy harvester and a battery, possibly with a level indicator. Data is transmitted on the UL by reflecting the incident wave in accordance with the payload. The antenna load in the ICM can be configured to different impedance states and the antenna load modulator can configure the antenna load dynamically in accordance with specified modulation type and payload.

The antenna load determines both the transmitted energy and the harvested energy. If the power of the incident RF signal is $P_{IN}$ and the antenna load is configured to power reflectance coefficient of $\Gamma$, then the harvested power is $(1-\Gamma)P_{IN}\lambda$, where $\lambda<1$ is the power conversion efficacy of the energy harvester. The transmitted or reflected energy is $\Gamma P_{IN}$.

Currently deployed indirect carrier modulation transmission systems (e.g. inductive coupled NFC and backscatter coupled RFID) suffer from a fixed tradeoff between UL throughput, reliability and DL energy harvesting efficiency. Each specified device class is optimized for either DL energy harvesting efficiency (i.e. battery-less passive class of devices) or UL throughput and reliability (i.e. semi-passive class of devices with on-board battery). Existing products are designed to support only a single class of operation and all classes support relatively low data rates.

Inductively Coupled Indirect Carrier Modulation Transmission

There is an inherent tradeoff between communication range and throughput in inductively coupled indirect carrier modulation transmission systems (e.g. NFC). Increasing the UL throughput by reducing the data symbol duration reduces the communication range.

A higher coupling quality factor between the reader and the transponder results in a reduced bandwidth link. While this limits the realizable minimum duration of the UL data symbol and therefore maximum UL throughput, it results in an increase in the DL power transfer efficiency. Reducing the coupling quality factor in order to increase the link bandwidth and thereby enable a shorter symbol duration to support a higher UL throughput reduces the DL power transfer efficiency. The reader and transponder must then be closer to each other in order to support fully passive or even semi-passive operation.

This tradeoff between UL communication range and throughput can be mitigated by using higher-order modulation (e.g. QPSK, 16-QAM). However, enabling higher-order modulation using conventional approaches in transmission systems that employ indirect carrier modulation suffers from a tradeoff between throughput and transponder complexity.

Currently proposed approaches map points from the UL constellation to individual reflectance states in the antenna load modulator. This means that e.g. 16 different reflectance states are needed to support 16-QAM. Since the number of reflectance states scales with the modulation order, the complexity of the antenna load modulator can become impractical, especially for passive and semi-passive transponders supporting higher order modulation (e.g. 64-QAM). Attention must be paid to passive and semi-passive transponder complexity as it directly impacts cost of the transponder.

Backscatter Coupled Indirect Carrier Modulation Transmission

In backscatter coupled indirect carrier modulation systems, there is an inherent tradeoff between reflected power on the UL and the harvested power on the DL. Performance of the UL is coupled to the DL via energy harvesting functionality in backscatter systems (e.g. RFID) that simultaneously exchange data on the UL while at the same time delivering power on the DL.

The choice of UL constellation (number and separation between constellation points) impacts both the UL performance (e.g. throughput, BER) and the DL power harvesting efficiency. Improving UL signal-to-noise ratio and therefore BER by creating wider separation between constellation points results in a reduction in the DL power harvesting efficiency. Increasing UL throughput and spectral efficiency using higher order modulation for a specified minimum BER performance also results in a reduction in the DL power harvesting efficiency.

Many emerging ultra-low power use cases envisioned for e.g. 5G NR are expected to employ backscatter coupled indirect carrier modulation transmission in the terminal device. These devices will have to support multiple modes of operation delivering increased data rates and link reliability or long battery life, as needed. Such terminal devices could benefit from improved coded modulation schemes and constellation adaptation procedures for inductive and backscatter coupled indirect carrier modulation transmission systems.

Constellation Adaptation

Figure 2A:
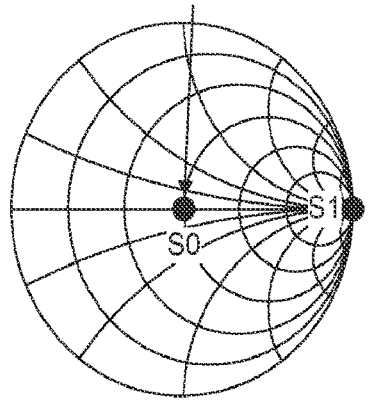
FIGS. 2A and 2B respectively illustrate first-order indirect carrier modulation schemes and the associated 2-point constellations using OOK and BPSK.
Figure 2B:
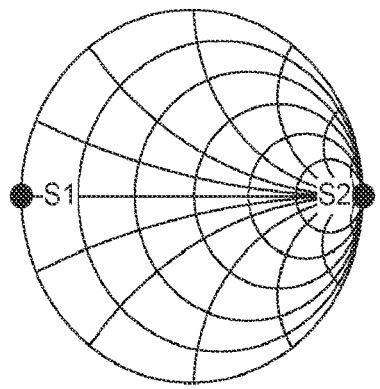

In indirect carrier modulation (ICM) transmission systems, the performance of the UL is coupled to the DL via the energy harvesting functionality. For example, backscattering transponders (e.g. RFID) transmit data on the UL while at the same time harvesting energy on the DL using the same RF carrier. Two commonly used 1st order indirect carrier modulation schemes and the associated 2-point constellations are illustrated in FIGS. 2A and 2B, respectively. The constellation in FIG. 2A utilizes On-off keying (OOK) with the zero-reflectance (100% absorbance) state, S0, of the ICM as a point in the constellation and a zero-absorbance (100% reflectance) state, S1, whereas the constellation in FIG. 2B utilizes Binary Phase-Shift Keying (BPSK) with two zero-absorbance (100% reflectance) states, S1 and S2. The DL energy harvesting efficiency of the approach in FIG. 2B is 0% but it transmits a higher energy per symbol in the UL as compared to the approach in FIG. 2A. On the other hand, the approach in FIG. 2A delivers better DL energy harvesting efficiency but transmits lower energy per symbol in the UL.

Figure 3A:
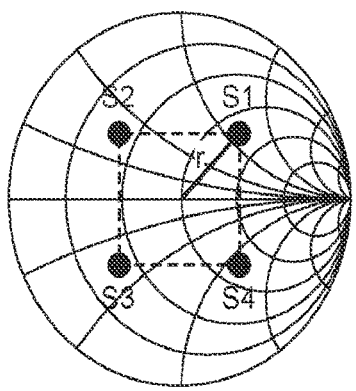
FIGS. 3A and 3B respectively illustrate examples of second order indirect carrier modulation schemes and the associated 4-point constellations using QPSK and 4-QAM.
Figure 3B:
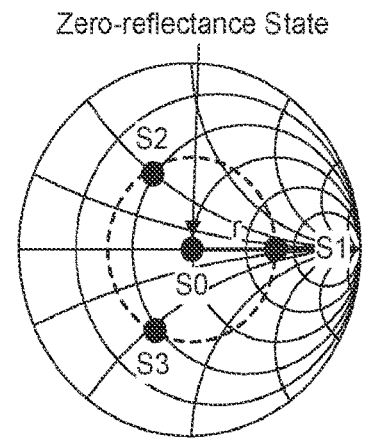

Two examples of second order indirect carrier modulation schemes and the associated 4-point constellations are illustrated in FIGS. 3A and 3B, respectively. The constellation in FIG. 3A utilizes Quadrature Phase-Shift Keying (QPSK) with four states, S1-S4, while the constellation in FIG. 3B utilizes four-point Quadrature Amplitude Modulation (4-QAM) with the zero-reflectance (100% absorbance) state, S0, of the ICM as a point in the constellation. If the vector distance r of the return loss circle across constellation points is held constant, the scheme in FIG. 3A can transmit higher energy per bit and ensure a relatively higher minimum separation between constellation points, whereas the scheme in FIG. 3B can deliver better DL energy harvesting efficiency, but with a relatively lower minimum separation between constellation points.

In an embodiment of the present principles, a WTRU can use an adaptive method in which the arrangement of constellation points for a given modulation order can be selected.

In such an adaptive method, the WTRU can adapt the signal constellation for a specified uplink modulation order. By utilizing the zero-reflectance state of the ICM as a point in the UL signal constellation (i.e. transmission muting), the UE can meet DL power reception requirements. The UE can enhance UL reliability by increasing the radii of return loss circles containing the ICM reflectance states representing points in the UL signal constellation. The WTRU can also perform signal constellation adaptation based on combined requirements of energy harvesting, payload reliability requirements for UL transmissions, and also select uplink signal constellation arrangement based on for example at least one of current battery level indicator, downlink power reception efficiency and uplink payload reliability.

The tradeoff between energy harvesting and UL-reliability can be achieved by determining the arrangement of constellation points for a corresponding modulation order (i.e. a specific number of constellation points). The device can perform automatic constellation adaptation triggered by e.g. a data re-transmission request from the network as will be described.

Figure 14:
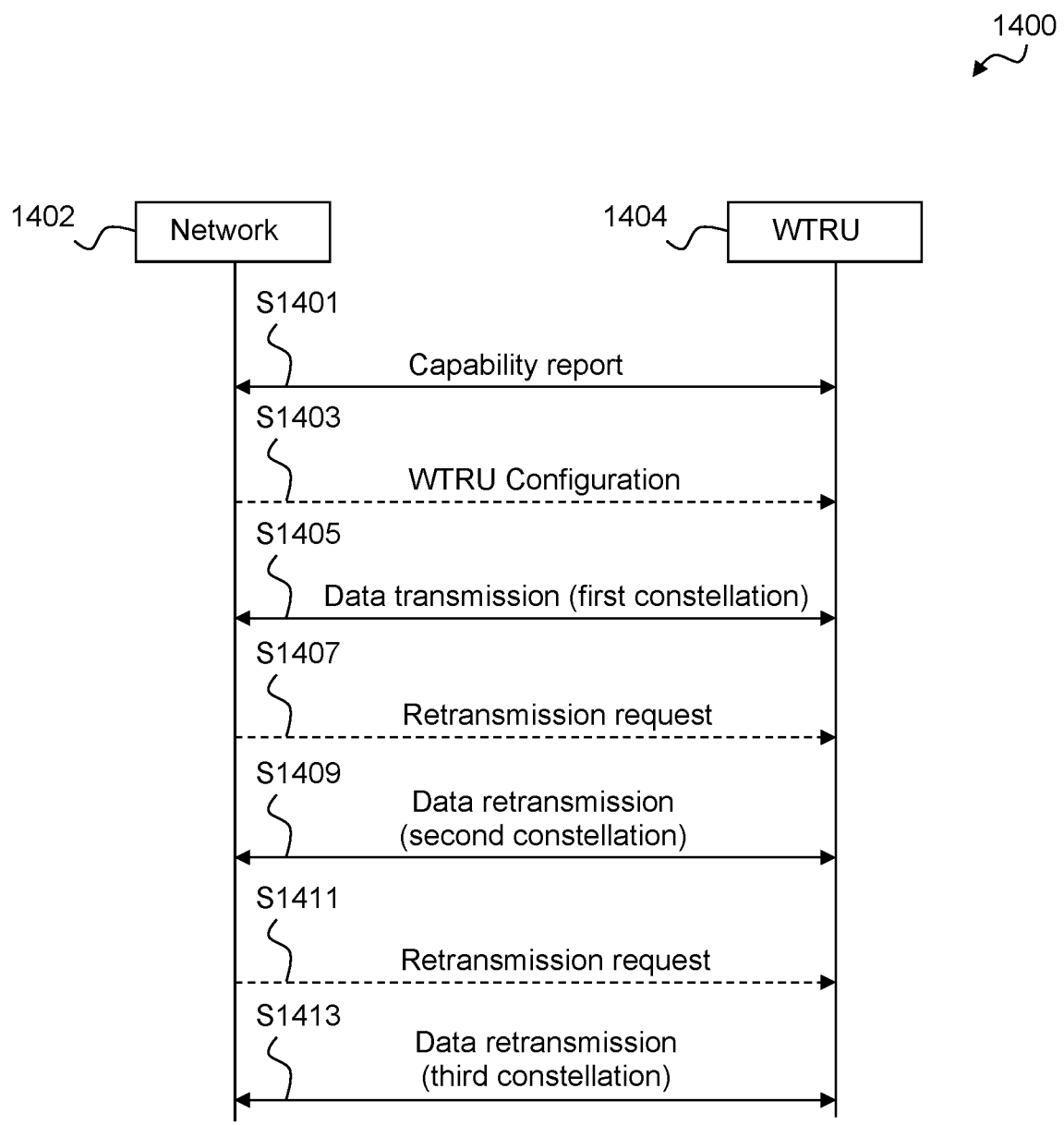
FIGS. 14-19 illustrate examples of possible transmissions method according to embodiments of the present principles.

FIG. 14 illustrates an example of a possible transmission method 1400 according to an embodiment of the present principles. In the example, a network 1402 and a WTRU 1404 communicate.

In step S1401, the network sends an unmodulated (CW) transmission to the WTRU that reflects to the network a capability report, for example including a list of supported constellation arrangements for each supported modulation order.

In step S1403, the network sends to the WTRU a modulated transmission including a WTRU Configuration with a priority order for at least part of the list of supported constellation arrangements.

In step S1405, the network sends an unmodulated (CW) transmission to the WTRU that uses the highest priority constellation arrangement for the relevant modulation order when reflecting data.

In step S1407, the network sends to the WTRU a modulated transmission including a first retransmission request.

In step S1409, the network sends an unmodulated (CW) transmission to the WTRU that uses the next (i.e. second) highest priority constellation arrangement for the relevant modulation order when reflecting the data in the retransmission.

In step S1411, the network sends to the WTRU a modulated transmission including a second retransmission request.

In step S1413, the network sends an unmodulated (CW) transmission to the WTRU that uses the next (i.e. third) highest priority constellation arrangement for the relevant modulation order when reflecting the data in the retransmission.

In an embodiment, the device can utilize a pre-specified or pre-configured modulation type and order with a pre-specified or pre-configured arrangement of points in the constellation to report its list of supported constellation arrangements for each supported modulation order. As an example, the device can use the standard constellation for OOK modulation illustrated in FIG. 2A to report its list of supported constellation arrangements for each supported modulation. As an additional example, the list of constellation arrangements supported by the device for e.g. a second order modulation including the standard constellation for QPSK is illustrated in FIG. 3A and a second constellation utilizing the zero-reflectance state (S0) is illustrated in FIG. 3B.

In another embodiment, the device receiving configuration including a priority order or ranking for the reported list of constellation arrangements for each reported modulation order. For example, a default constellation type (e.g. highest priority) for e.g. battery-less passive devices can be one that delivers highest supported DL energy harvesting efficiency; an example of a default constellation type for second order modulation is the constellation utilizing the zero-reflectance state (S0) illustrated in FIG. 3B. A lowest priority constellation for e.g. battery-less passive devices can be one that delivers the highest UL transmitted energy per bit for a given modulation order; an example of a lowest priority constellation type for second order modulation being the standard constellation for QPSK illustrated in FIG. 3A.

In an embodiment, the device transmitting data uses the highest priority constellation arrangement delivering the highest supported DL energy harvesting efficiency.

In an embodiment, the device receives a data re-transmission request from the network or fails to receive an ACK within a pre-specified time window for a consecutive specified, signaled or preconfigured number of times.

In an embodiment, upon receives a data re-transmission request from the network, the device switches to the next configured constellation and modulation type on the priority list to re-transmit the data.

In an embodiment, the device continues data transmission using the selected constellation and modulation type as long as no additional data re-transmission requests are received from the network. Otherwise, the device selects the next configured constellation and modulation types on the priority list to re-transmit the data. The device can repeat this process until the priority list is exhausted or an overall signaled or preconfigured number of retransmissions has been achieved, upon which the device can declare a data transmission/connection failure.

Network assisted procedures where the WTRU has full control of which constellation arrangement for a given modulation order it uses will now be described in the following embodiments. In this case, the network is assumed to be capable of blindly detecting which transmission configuration has been utilized for data transmission by the WTRU.

Figure 15:
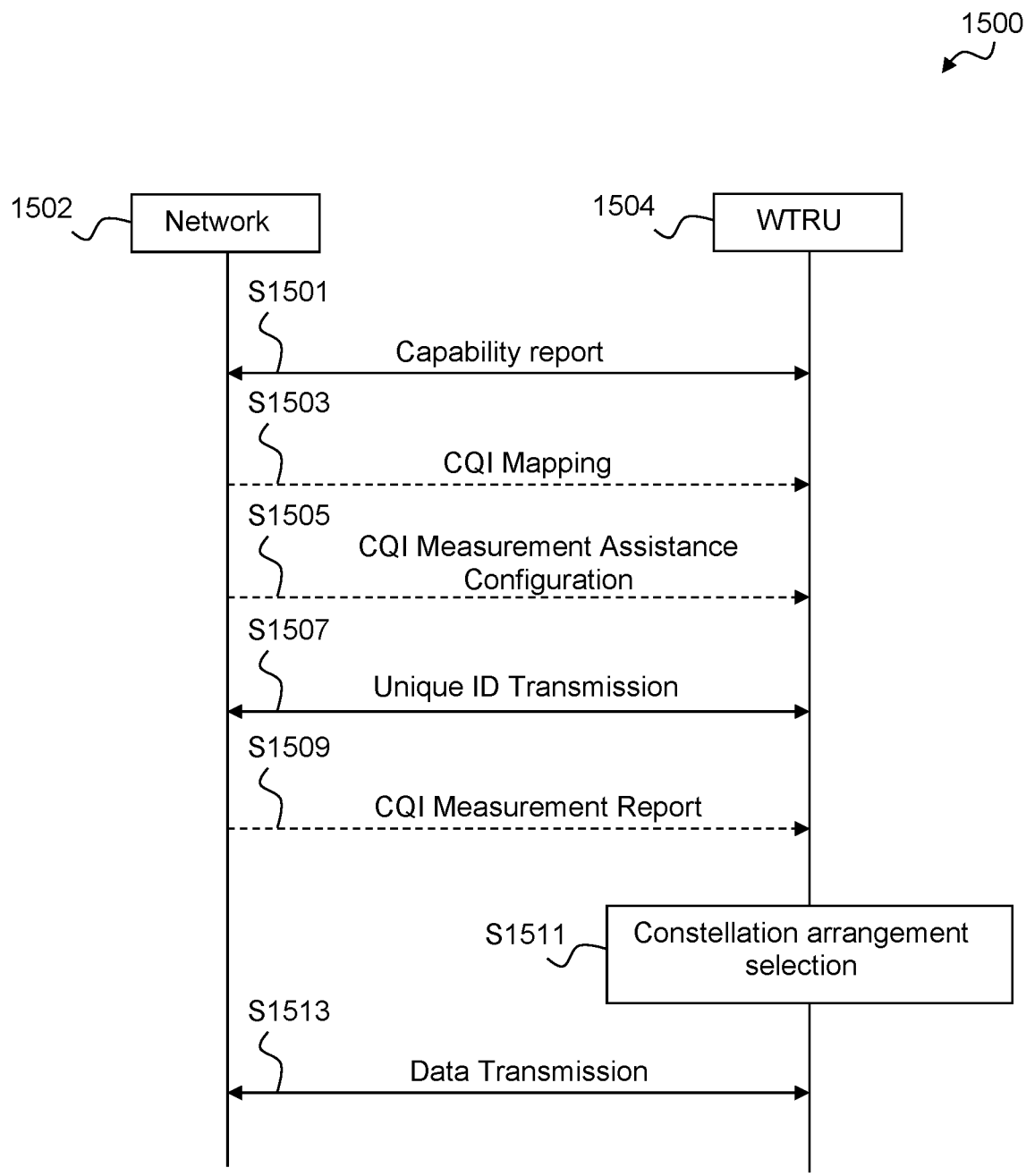

FIG. 15 illustrates an example of a possible transmission method 1500 according to an embodiment of the present principles. In the example, a network 1502 and a WTRU 1504 communicate.

In step S1501, the network sends an unmodulated (CW) transmission to the WTRU that reflects to the network a capability report, for example including a list of supported constellation arrangements for each supported modulation order.

In step S1503, the network sends to the WTRU a modulated transmission including a Channel-Quality Indicator (CQI) Mapping including a mapping between CQI values and supported constellation arrangements in the reported list.

In step S1505, the network sends to the WTRU a modulated transmission including a CQI Measurement Assistance Configuration including unique ID and unique ID transmission occasions (e.g. timing and frequency configuration). The unique ID is to be utilized for transmission by the device and allows the network to identify the transmitting device and measure the channel quality associated with the transmitting device.

In step S1507, the network sends an unmodulated (CW) transmission to the WTRU that reflects a Unique ID transmission to the network.

In step S1509, the network sends to the WTRU a modulated transmission including a CQI Measurement Report.

In step S1511, the WTRU selects the constellation arrangement based on the CQI value reported by the network and the configured CQI Mapping.

In step S1513, the network sends an unmodulated (CW) transmission to the WTRU that uses the selected constellation arrangement to reflect data to the network.

In an embodiment, the WTRU utilizes a pre-specified or pre-configured modulation type and order with a pre-specified or pre-configured arrangement of points in the constellation to report its list of supported constellation arrangements for each supported modulation order. As an example, the WTRU can use the standard constellation for OOK modulation illustrated in FIG. 2A to report its list of supported constellation arrangements for each supported modulation. As an additional example, the list of constellation arrangements supported by the WTRU for e.g. a second order modulation includes the standard constellation for QPSK illustrated in FIG. 3A and a second constellation utilizing the zero-reflectance state (S0) illustrated in FIG. 3B.

In an embodiment, the WTRU receives a mapping between Channel-Quality Indicator (CQI) values and the reported list of constellation arrangements for each reported modulation order.

In an embodiment, the WTRU receives CQI measurement assistance configuration, e.g. a unique ID, periodicity of the unique ID transmission occasions.

In an embodiment, the WTRU utilizes signaled modulation type/order and constellation/symbol configuration to periodically transmit the configured unique ID and facilitate CQI measurement by the network.

In an embodiment, the WTRU receives a CQI measurement report including the current measured CQI value ($Q_i$) from the network periodically or conditional on $Q_i$ satisfying the relationship $|Q_i - f(\{Q_j\}_{j \in \{i-N, i-N+1, \ldots, i-1\}})| > \delta$ where $f(\ )$ is a function of the last N measurements.

In an embodiment, the WTRU selects the constellation arrangement from the pre-configured list based on the CQI value reported by the network and preconfigured mapping.

In an embodiment, the WTRU continues data transmission using the selected new constellation arrangement and modulation order.

A fully autonomous procedure where a WTRU performs constellation adaptation based on the evaluation of a performance indicator is described in the following embodiments.

Figure 16:
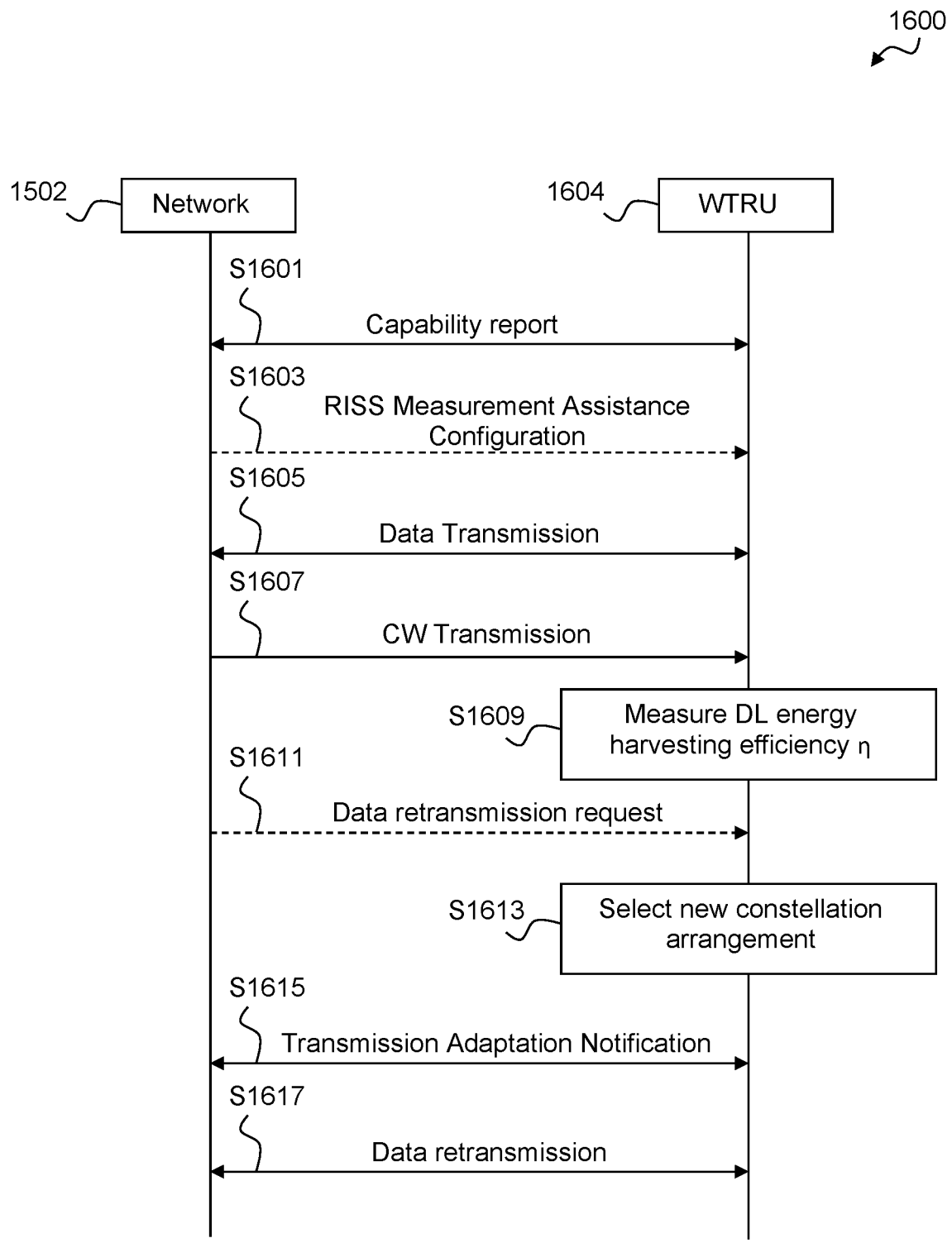

FIG. 16 illustrates an example of a possible transmission method 1600 according to an embodiment of the present principles. In the example, a network 1602 and a WTRU 1604 communicate and it is assumed that the network is capable of blindly detecting which transmission configuration has been utilized for data transmission by the WTRU.

In step S1601, the network sends an unmodulated (CW) transmission to the WTRU that reflects to the network a capability report, for example including a list of supported constellation arrangements for each supported modulation order.

In step S1603, the network sends to the WTRU a modulated transmission including a Received Interrogation Signal Strength (RISS) Measurement Assistance Configuration message including CW transmission occasions to allow RISS measurement.

In step S1605, the network sends an unmodulated (CW) transmission to the WTRU that reflects data to the network.

In step S1607, the network sends to the WTRU an unmodulated transmission, as announced in the RISS Measurement Assistance Configuration message.

In step S1609, the WTRU measures its DL energy harvesting efficiency η.

In step S1611, the network sends to the WTRU a modulated transmission including a retransmission request.

In step S1613, the WTRU selects a new constellation arrangement based on performance indicators, e.g. {ηRISS−$P_{ICM}$}(N/R)>δ and $E_{TX}$>Δ, where Picts is the power consumption of the ICM when configured for the new constellation, N is the UL data packet size, R the UL data rate, $E_{TX}$ in the UL transmitted energy per symbol and δ, Δ are optimization goals that might be preconfigured at the UE or signaled by the network as part of triggering criteria.

In step S1615, the network sends an unmodulated (CW) transmission to the WTRU that uses a pre-configured or pre-specified modulation type to reflect to the network a Transmission Adaptation Notification.

In step S1617, the network sends an unmodulated (CW) transmission to the WTRU that uses the newly selected constellation arrangement to reflect data to the network.

In an embodiment, the WTRU utilizes a pre-specified or pre-configured modulation type and order with a pre-specified or pre-configured arrangement of points in the constellation to report its list of supported constellation arrangements for each supported modulation order. As an example, the WTRU uses the standard constellation for OOK modulation illustrated in FIG. 2A to report its list of supported constellation arrangements for each supported modulation. As a further example, the list of constellation arrangements supported by the device for e.g. a second order modulation includes the standard constellation for QPSK illustrated in FIG. 3A and a second constellation utilizing the zero-reflectance state (S0) illustrated in FIG. 3B.

In an embodiment, the WTRU receives configuration of occasions for measuring the received interrogation signal strength (RISS).

In an embodiment, the WTRU receives CW transmissions from the network and measures RISS over one or more measurement occasions and determines the DL energy harvesting efficiency (η) associated with current UL transmission configuration.

In an embodiment, the WTRU receives a data re-transmission request from the network or a notification from its PMU.

In an embodiment, the WTRU selects a new constellation arrangement from the list of pre-specified UL constellation arrangements such that the performance indicators ($E_H$−$F_{RX}$)={ηRISS−$P_{ICM}$}(N/R)>δ and $E_{TX}$>Δ, where $P_{ICM}$ is the power consumption of the ICM when configured for the new constellation, N is the UL data packet size, R the UL data rate, $E_{TX}$ is the UL transmitted energy per symbol and δ, Δ are optimization goals that might be preconfigured at the WTRU or signaled by the network as part of triggering criteria.

In an embodiment, the WTRU utilizes a pre-specified/pre-configured modulation type and order with a pre-specified/pre-configured arrangement of points in the constellation to transmit a UL transmission adaptation notification message indicating the newly selected transmission configuration to be used in the following UL data packets. This embodiment may be omitted in the set of steps taken by the WTRU as illustrated in FIG. 15 if the network is assumed to be capable of blindly detecting which transmission configuration has been utilized for data transmission by the WTRU.

In an embodiment, the WTRU transmits UL data packets using the new transmission configuration including a new constellation arrangement.

Hybrid Phase-Amplitude Indirect Carrier Modulation

Figure 4A:
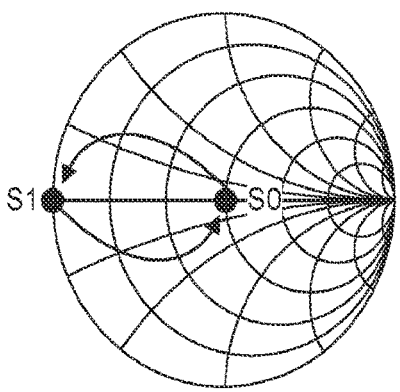
FIGS. 4A and 4B illustrate the ICM state transitions and the transmitted waveform associated with a commonly used Manchester-encoded OOK indirect carrier modulation scheme.
Figure 4B:
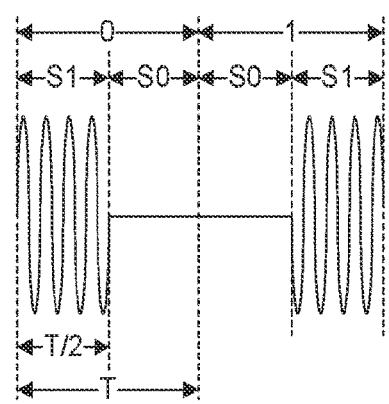

In indirect carrier modulation transmission systems, the performance of the UL is coupled to the DL via energy harvesting functionality. For example, backscattering transponders (e.g. RFID) transmit data on the UL while at the same time harvesting energy on the DL using the same RF carrier. The ICM state transitions and the transmitted waveform associated with a commonly used Manchester-encoded on-off keying (OOK) indirect carrier modulation scheme is illustrated in FIGS. 4A and 4B. The illustrated scheme is used to transmit one bit per symbol. The scheme employs a 50% duty cycle factor and splits the symbol period into two equal sections. When transmitting a '0', the ICM is remains in reflectance state S1 during the first half of the symbol and transitions to zero-reflectance state S0 in the second half of the symbol. The ICM state transitions are reversed when transmitting a '1' as illustrated in the right-hand side of.

The DL energy harvesting efficiency is defined as the portion of the incident RF energy that is harvested and stored in the transponder's battery. The normalized energy harvesting efficiency of the DL is η=$E_H$/$E_0$, where $E_0$ is the available incident energy and $E_H$ is the harvested energy. The harvested energy $E_H$ is defined as $$E_H = (T/2) P_{IN} \Sigma_{k=0}^{1}(1-\Gamma_k)$$ (Equation 1)

T is the symbol duration and $\Gamma_k$ are the power reflectance coefficients associated with the ICM state used to represent each symbol. Note that for the example illustrated in FIG. 4A, Γ=0 for S0 and Γ=1 for S1 and $E_H$=$TP_{IN}$/2. $E_0$ is computed assuming that the ICM remains in state S0 (Γ=0) for the entire duration T and therefore $E_0$=$TP_{IN}$ and the normalized energy harvesting efficiency η=50%. A similar approach can be used to determine the transmitted energy per symbol $E_{TX}$ as defined as $$E_{TX} = (T/2) P_{IN} \Sigma_{k=0}^{1} \Gamma_k$$ (Equation 1)

For the example illustrated in FIG. 4A, Γ=0 for S0 and Γ=1 for S1 and $E_{TX}$=$TP_{IN}$/2. The gNB receiver-decoder uses a data slicer including a carrier threshold detector. Since the bit duration and the duty cycle factor are specified by standards, the gNB receiver-decoder knows where to sample the received waveform.

Figure 5A:
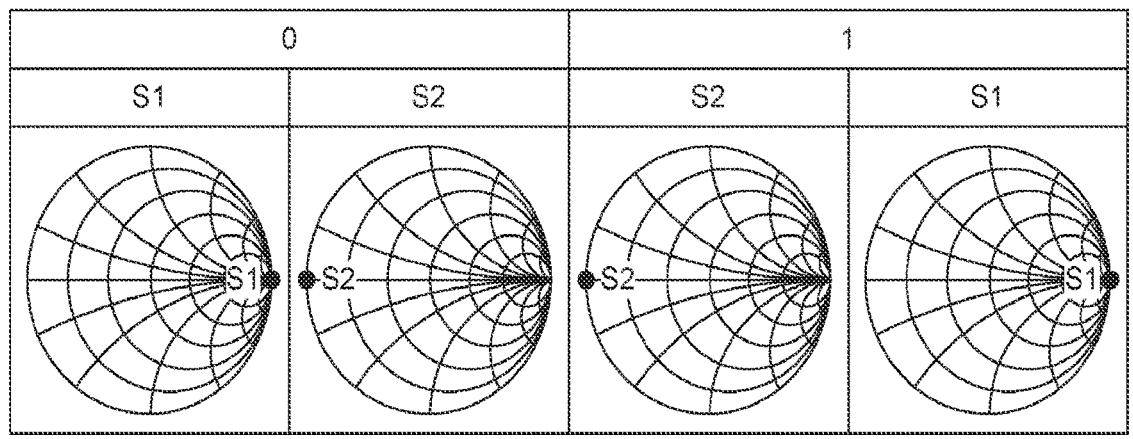
FIGS. 5A and 5B illustrate another example of a Manchester-encoded indirect carrier modulation scheme employing BPSK to transmit one bit per symbol.
Figure 5B:
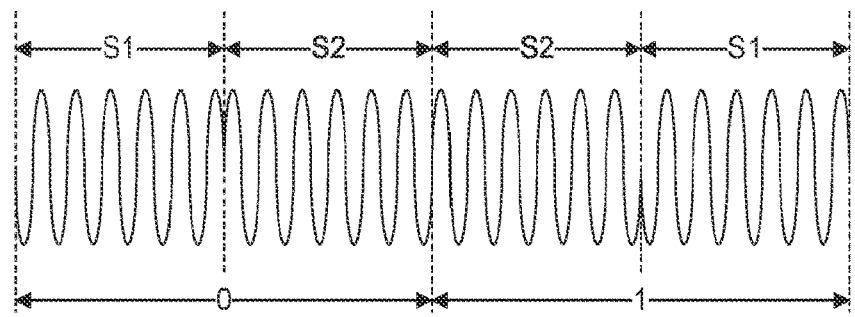

FIGS. 5A and 5B illustrate another example of a Manchester-encoded indirect carrier modulation scheme employing binary phase-shift-keying (BPSK) to transmit one bit per symbol. The scheme employs a 50% duty cycle factor and splits the symbol period into two equal sections. When transmitting a '0', the ICM is in state S1 during the first half of the symbol and transitions to state S2 in the second half of the symbol. The ICM state transitions are reversed when transmitting a '1' as illustrated in FIGS. 5A and 5B. it is noted that for the example illustrated in FIG. 5A, Γ=1 for both S1 for S2. Thus, the harvested energy $E_H$=0, the normalized energy harvesting efficiency η=0 and, since all the incident RF energy is reflected, and therefore $E_{TX}$=$TP_{IN}$. The gNB receiver-decoder uses a phase discriminator. Since the bit duration and the duty cycle factor are specified by standards, the gNB receiver-decoder knows where to look for the phase transitions in the received waveform.

In comparison, the coded indirect carrier modulation scheme illustrated in FIGS. 4A and 4B, employing OOK, provides a better energy harvesting efficiency while the scheme illustrated in FIGS. 5A and 5B, employing BPSK, delivers a higher transmitted energy per bit. This represents a fixed tradeoff between DL energy harvesting efficiency and UL reliability. As can be seen, flexible coded modulation schemes that can provide additional degrees of freedom such that a tradeoff between DL energy harvesting and UL reliability can be made as required by different use cases and deployment scenarios can be desired.

Figure 6A:
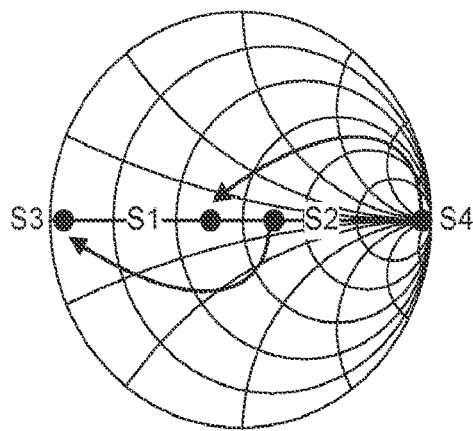
FIGS. 6A and 6B illustrate a hybrid phase-amplitude indirect carrier modulation scheme according to an embodiment of the present principles.
Figure 6B:
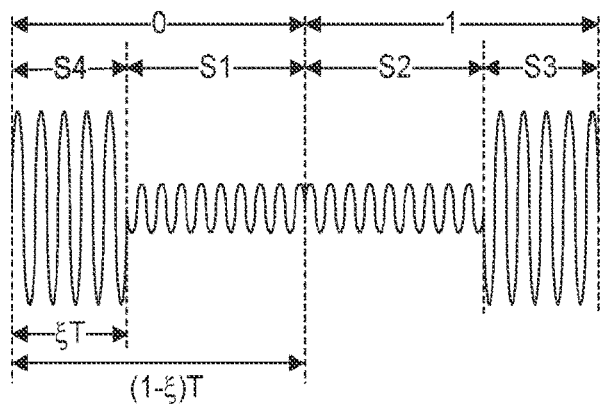

FIGS. 6A and 6B illustrate a hybrid phase-amplitude indirect carrier modulation scheme according to an embodiment of the present principles. The example scheme is for transmitting one bit per symbol.

Generally speaking, such a hybrid phase-amplitude indirect carrier modulation scheme can be obtained by a UE using hybrid phase-amplitude indirect RF carrier modulation with two degrees of freedom for encoded data transmission, wherein the two degrees of freedom can be a duty cycle factor and a modulation depth. The UE can use changes in carrier amplitude and carrier phase to encode data symbols and symbol boundaries. The ICM states can be arranged into two pairs of antipodal reflectance states {S1, S2} and {S3, S4}, and a first symbol can be encoded using a duty cycle factor and a transition from state S4 to S1, while a second can be encoded using a duty cycle factor and a transition from state S2 to S3.

As mentioned, one of the degrees of freedom is the duty cycle factor $\xi$ that can be configured, where $0<\xi<1$. This means that the data symbol is split into two portions, $\xi T$ and $(1-\xi)T$. The ICM remains in state S4 during the first $\xi T$ portion of the symbol and transitions to state S1 for the remaining $(1-\xi)T$ portion of the symbol when transmitting a '0'. The ICM remains in state S2 during the first $(1-\xi)T$ portion of the symbol and transitions to state S3 during the remaining $\xi T$ portion of the symbol when transmitting a '1'. It will be understood, that the significance of the state transitions can be different, for example inversed.

States S1, S2 can implement the same power reflectance coefficient $\Gamma_{1,2}$ and the states S3, S4 can implement the same power reflectance coefficient $\Gamma_{3,4}$. It is noted that there is a 180-degree phase difference in the reflected waveforms associated with states S1 and S2 and that, similarly, there is a 180-degree phase difference in the reflected waveforms associated with states S3 and S4. The modulation depth $\delta$ is defined as the ratio of the two power reflectance coefficients $\Gamma_{1,2}$ and $\Gamma_{3,4}$, specifically $\delta=\Gamma_{1,2}/\Gamma_{3,4}$.

The normalized energy harvesting efficiency of the DL is $\eta=E_H/E_0$ where $E_0=TP_{IN}$ is the available incident energy and $E_H$ is the harvested energy. The harvested energy $E_H$ is $$E_H=TP_{IN}\{\xi(1-\Gamma_{3,4})+(1-\xi)(1-\Gamma_{1,2})\} \quad \text{(Equation 2)}$$

where T is the symbol duration and $\Gamma_{1,2}$ and $\Gamma_{3,4}$ are the power reflectance coefficients associated with the ICM state used to represent each symbol. It is noted that for the example illustrated in FIG. 6A, $\Gamma_{3,4}=1$. Assuming that $\Gamma_{1,2}=\frac{1}{2}$ and $\xi=0.25$ the harvested energy $$E_H = \frac{3}{8}TP_{IN}.$$

Therefore, the normalized energy harvesting efficiency $\eta=37.5\%$. A similar approach can be used to determine the transmitted energy per symbol $E_{TX}$ as $$E_{TX}=TP_{IN}\{\xi\Gamma_{3,4}+(1-\xi)\Gamma_{1,2}\} \quad \text{(Equation 3)}$$

For the example illustrated in FIG. 6A, assuming that $\Gamma_{1,2}=\frac{1}{2}$ and $\xi=0.25$ the transmitted energy per symbol $$E_{TX} = \frac{5}{8}TP_{IN}.$$

The duty cycle factor $\xi$ and the modulation depth $\delta$ based on UL transmission reliability and power harvesting requirements can be selected as follows.

The DL energy harvesting efficiency can be increased by reducing the duty cycle factor and increasing the modulation depth.

The UL reliability (i.e. transmitted energy per bit) can be increased by increasing the duty cycle factor and reducing the modulation depth.

FIGS. 7A and 7B illustrate a decoding scheme for hybrid phase-amplitude indirect carrier modulation transmission according to an embodiment of the present principles. FIG. 7A illustrates the transmitted waveform, similar to that in FIG. 6B, and FIG. 7B illustrates output waveforms of a receiver-decoder employing an amplitude and a phase detector.

The WTRU can use a data slicer (e.g. amplitude detector) including a carrier threshold detector and a phase detector to detect the boundaries between the data symbols and the boundaries within the symbol. The allowable settings for the duty cycle factor $\xi$ and the modulation depth b can be specified by standards so that the UE knows how to set the data slicer threshold and where to sample the output of the data slicer.

The tradeoff between energy harvesting and UL-reliability can be achieved by determining the appropriate combination of values for the parameter pair $\{\xi, \delta\}$ describing the modulation scheme and including the duty cycle factor $\xi$ and the modulation depth $\delta$. The WTRU can perform automatic constellation adaptation triggered by e.g. a data re-transmission request from the network using the embodiments below.

Figure 17:
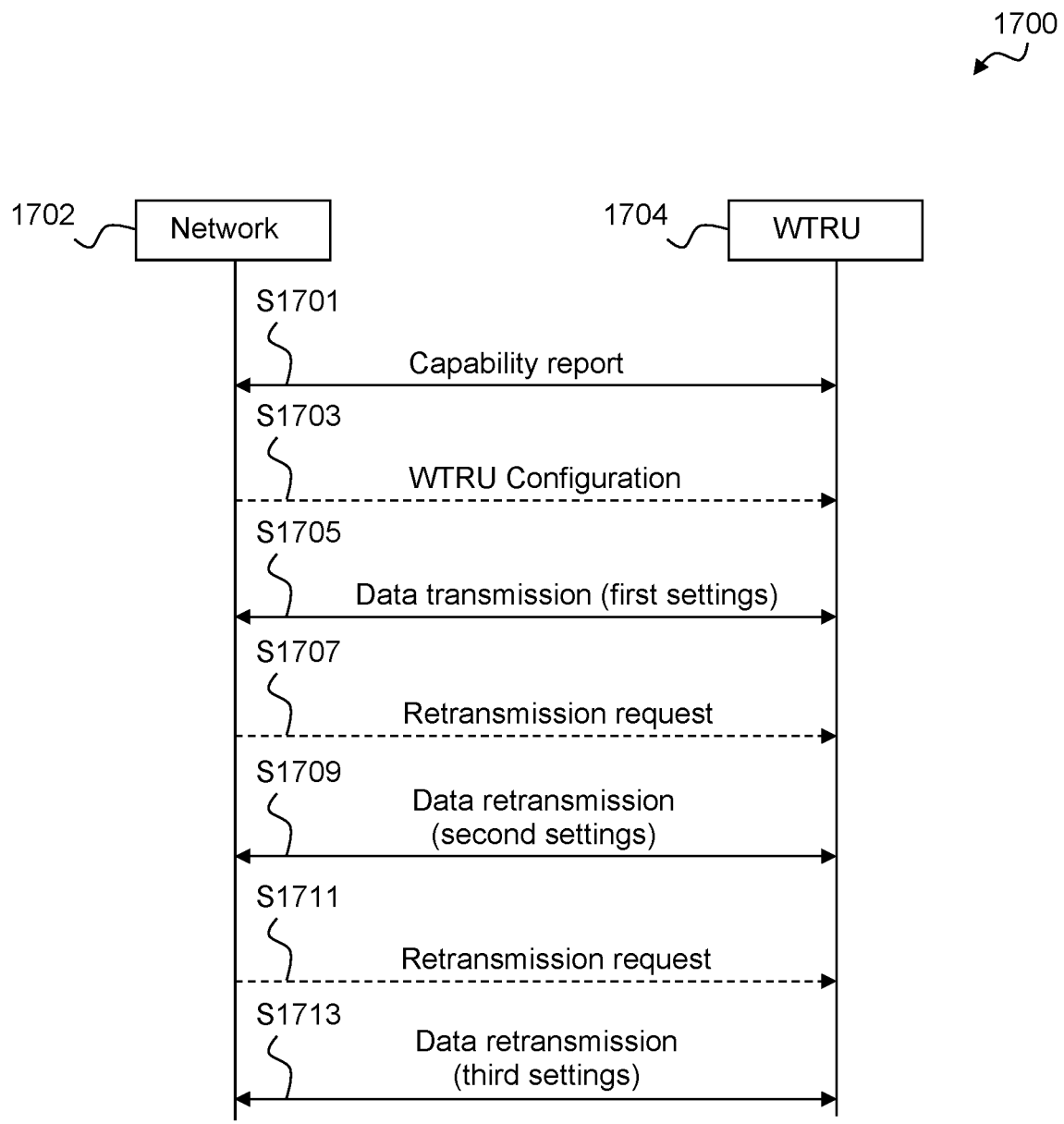

FIG. 17 illustrates an example of a possible transmission method 1700 according to an embodiment of the present principles. In the example, a network 1702 and a WTRU 1704 communicate.

In step S1701, the network sends an unmodulated (CW) transmission to the WTRU that reflects to the network a capability report, for example including a list of supported duty cycle factors $\xi$ and modulation depths $\delta$.

In step S1703, the network sends to the WTRU a modulated transmission including a WTRU Configuration with a priority order for at least part of the list of supported values for the parameter pair $\{\xi,\delta\}$.

In step S1705, the network sends an unmodulated (CW) transmission to the WTRU that uses the highest priority settings for the parameter pair $\{\xi,\delta\}$ when reflecting data.

In step S1707, the network sends to the WTRU a modulated transmission including a first retransmission request.

In step S1709, the network sends an unmodulated (CW) transmission to the WTRU that uses the next (i.e. second) highest priority settings for the parameter pair $\{\xi,\delta\}$ when reflecting the data in the retransmission.

In step S1711, the network sends to the WTRU a modulated transmission including a second retransmission request.

In step S1713, the network sends an unmodulated (CW) transmission to the WTRU that uses the next (i.e. third) highest priority settings for the parameter pair $\{\xi,\delta\}$ when reflecting the data in the retransmission.

In an embodiment, the WTRU utilizes a pre-specified/pre-configured modulation type to report its list of supported duty cycle factors $\xi$ and the modulation depths $\delta$ for hybrid phase-amplitude indirect carrier modulation.

In an embodiment, the WTRU receives a priority order or ranking for the reported list of supported values for the parameter pair $\{\xi, \delta\}$ where, for example, a default (highest priority) set of values for the parameter pair $\{\xi, \delta\}$ for e.g.

passive devices is one that delivers highest supported DL energy harvesting efficiency; for instance, the default (highest priority) values for the parameter pair $\{\xi, \delta\}$ is the lowest supported duty cycle factor and the highest supported modulation depth to optimize DL energy harvesting. A lowest priority set of values for the parameter pair $\{\xi, \delta\}$ for e.g. passive devices is one that delivers the highest UL transmitted energy per bit; for instance, the lowest priority values for the parameter pair $\{\xi, \delta\}$ is the highest supported duty cycle factor and the lowest supported the modulation depth to optimize UL reliability (transmitted energy per bit).

In an embodiment, the WTRU commences data transmission using the default (highest priority) settings for the parameter pair $\{\xi, \delta\}$.

In an embodiment, the WTRU receives data re-transmission request or failing to receive an ACK within a pre-specified time window for a consecutive specified, signaled, or preconfigured number of times.

In an embodiment, the WTRU switches to the next configured settings for the parameter pair $\{\xi, \delta\}$ on the priority list to re-transmit the data.

In an embodiment, the WTRU continues data transmission using the selected new settings for the parameter pair $\{\xi, \delta\}$ as long as no additional data re-transmission requests are received from the network. Otherwise, the device selects the next configured values for the parameter pair $\{\xi, \delta\}$ on the priority list to re-transmit the data. The WTRU continues this process until the priority list is exhausted or an overall signaled or preconfigured number of retransmissions is achieved, after which the WTRU declares a data transmission/connection failure.

Network assisted procedures where the WTRU has full control of which values for the parameter pair $\{\xi, \delta\}$ it uses is described in the following embodiments. In this case, the network is assumed to be capable of blindly detecting which transmission configuration has been utilized for data transmission by the WTRU.

Figure 18:
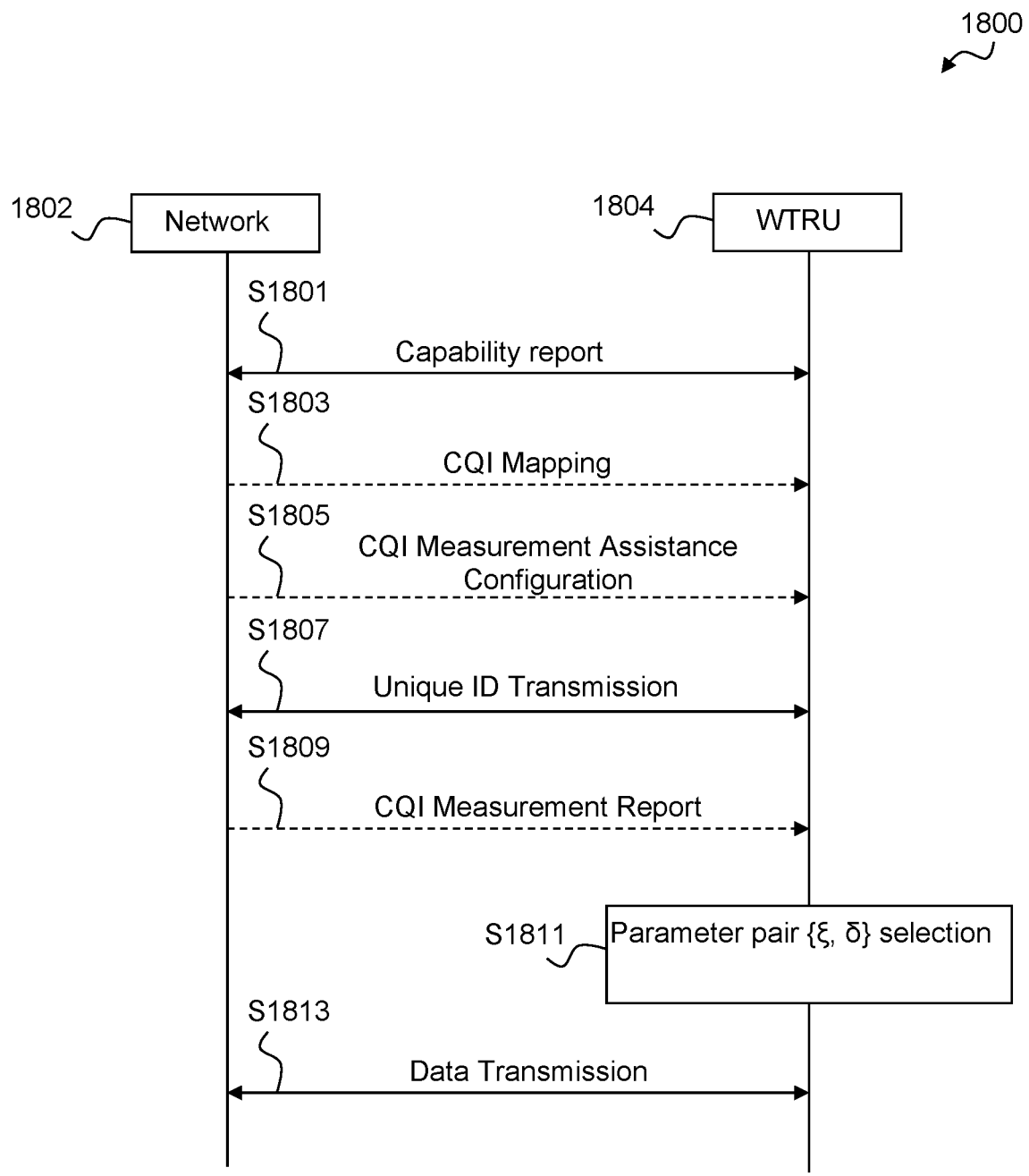

FIG. 18 illustrates an example of a possible transmission method 1800 according to an embodiment of the present principles. In the example, a network 1802 and a WTRU 1804 communicate.

In step S1801, the network sends an unmodulated (CW) transmission to the WTRU that reflects to the network a capability report, for example including a list of supported duty cycle factors $\xi$ and modulation depths $\delta$.

In step S1803, the network sends to the WTRU a modulated transmission including a Channel-Quality Indicator (CQI) Mapping including a mapping between CQI values and at least part of the list of supported values for the parameter pair $\{\xi, \delta\}$.

In step S1805, the network sends to the WTRU a modulated transmission including a CQI Measurement Assistance Configuration including unique ID and unique ID transmission occasions (e.g. timing and frequency configuration). The unique ID is to be utilized for transmission by the device and allows the network to identify the transmitting device and measure the channel quality associated with the transmitting device.

In step S1807, the network sends an unmodulated (CW) transmission to the WTRU that reflects a Unique ID transmission to the network.

In step S1809, the network sends to the WTRU a modulated transmission including a CQI Measurement Report.

In step S1811, the WTRU selects the parameter pair $\{\xi, \delta\}$ based on the CQI value reported by the network and the configured CQI Mapping.

In step S1813, the network sends an unmodulated (CW) transmission to the WTRU that uses the selected parameter pair $\{\xi, \delta\}$ to reflect data to the network.

In an embodiment, the WTRU utilizes a pre-specified/pre-configured modulation type to report its list of supported duty cycle factors $\xi$ and the modulation depths $\delta$ for hybrid phase-amplitude indirect carrier modulation.

In an embodiment, the WTRU receives a mapping between CQI values and the reported list of values for the parameter pair $\{\xi, \delta\}$.

In an embodiment, the WTRU receives CQI measurement assistance configuration, e.g. a unique ID, periodicity of the unique ID transmission occasions.

In an embodiment, the WTRU utilizes signaled modulation type/order and constellation/symbol configuration to periodically transmit the configured unique ID and facilitate CQI measurement by the network.

In an embodiment, the WTRU receives a CQI measurement report including the current measured CQI value ($Q_1$) from the network periodically or conditional on $Q_i$ satisfying the following relationship $|Q_i - f(\{Q_j\}_{j \in \{i-N, i-N+1, \ldots, i-1\}})| > \delta$ where f( ) is a function of the last N measurements.

In an embodiment, the WTRU selects the values for the parameter pair $\{\xi, \delta\}$ from the list reported in the first embodiment based on the CQI value reported by the network and a received preconfigured mapping between CQI values and the reported list of values for the parameter pair $\{\xi, \delta\}$.

In an embodiment, the WTRU continues data transmission using the selected new values for the parameter pair $\{\xi, \delta\}$.

A fully autonomous procedure where a WTRU performs constellation adaptation based on the evaluation of a performance indicator is described in the following embodiments.

Figure 19:
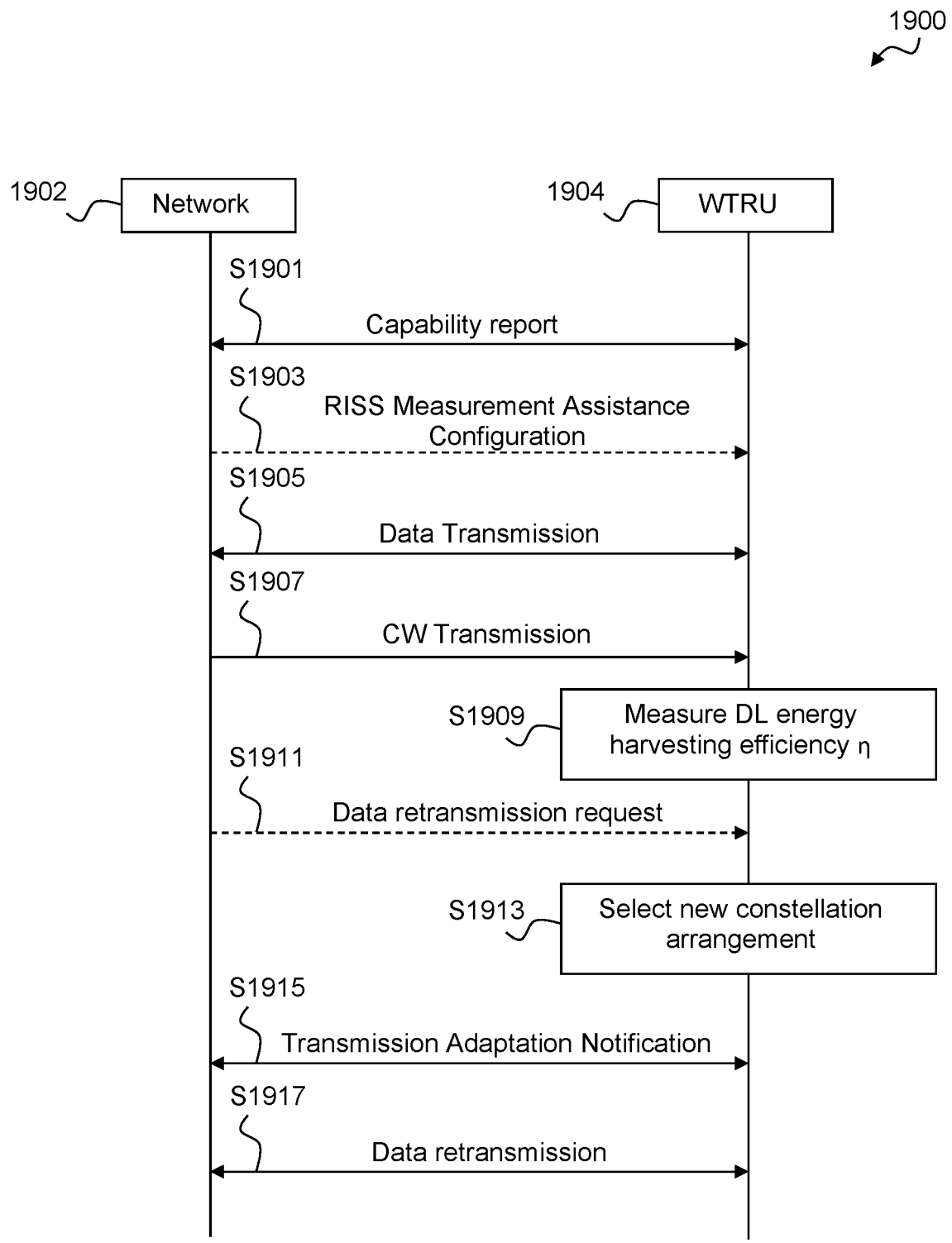

FIG. 19 illustrates an example of a possible transmission method 1900 according to an embodiment of the present principles. In the example, a network 1902 and a WTRU 1904 communicate and it is assumed that the network is capable of blindly detecting which transmission configuration has been utilized for data transmission by the WTRU.

In step S1901, the network sends an unmodulated (CW) transmission to the WTRU that reflects to the network a capability report, for example including a list of supported duty cycle factors $\xi$ and modulation depths $\delta$.

In step S1903, the network sends to the WTRU a modulated transmission including a Received Interrogation Signal Strength (RISS) Measurement Assistance Configuration message including CW transmission occasions to allow RISS measurement.

In step S1905, the network sends an unmodulated (CW) transmission to the WTRU that reflects data to the network.

In step S1907, the network sends to the WTRU an unmodulated transmission, as announced in the RISS Measurement Assistance Configuration message.

In step S1909, the WTRU measures its DL energy harvesting efficiency $\eta$.

In step S1911, the network sends to the WTRU a modulated transmission including a retransmission request.

In step S1913, the WTRU selects a new constellation arrangement based on performance indicators, e.g. $\{\eta RISS - P_{ICM}\}(N/R) > \delta$ and $E_{TX} > \Delta$, where $P_{ICM}$ is the power consumption of the ICM when configured for the new constellation, N is the UL data packet size, R the UL data rate, $E_{TX}$ is the UL transmitted energy per symbol and $\delta$, $\Delta$ are optimization goals that might be preconfigured at the UE or signaled by the network as part of triggering criteria.

In step S1915, the network sends an unmodulated (CW) transmission to the WTRU that uses a pre-configured or pre-specified modulation type to reflect to the network a Transmission Adaptation Notification.

In step S1917, the network sends an unmodulated (CW) transmission to the WTRU that uses the newly selected constellation arrangement to reflect data to the network.

In an embodiment, the WTRU utilizes a pre-specified/pre-configured modulation type to report its list of supported duty cycle factors $\xi$ and the modulation depths $\delta$ for hybrid phase-amplitude indirect carrier modulation.

In an embodiment, the WTRU receives configuration of occasions for measuring the Received Interrogation Signal Strength (RISS).

In an embodiment, the WTRU receives CW transmissions from the network and measuring RISS over one or more measurement occasions and determines the DL energy harvesting efficiency ($\eta$) associated with current UL transmission configuration.

In an embodiment, the WTRU receives a data re-transmission request from the network or a notification from its PMU.

In an embodiment, the WTRU selects new values for the parameter pair $\{\xi, \delta\}$ from the list reported in the first embodiment such that the performance indicators $(E_H - E_{TX}) = \{\eta \text{RISS} - P_{ICM}\}(N/R) > \delta$ and $E_{TX} \Delta$ where $P_{ICM}$ is the power consumption of the ICM when configured for the new constellation, N is the UL data packet size, R the UL data rate, $E_{TX}$ is the UL transmitted energy per symbol and $\delta$, $\Delta$ are optimization goals that might be preconfigured at the UE or signaled by the network as part of triggering criteria.

In an embodiment, the WTRU utilizes a pre-specified/pre-configured modulation type and order with a pre-specified/pre-configured arrangement of points in the constellation to transmit a transmission adaptation notification message indicating the newly selected transmission configuration to be used in the following UL data packets. This embodiment may be omitted in the set of steps taken by the WTRU illustrated in FIG. 19 if the network is assumed to be capable of blindly detecting which transmission configuration has been utilized for data transmission by the UE.

In an embodiment, the WTRU transmits UL data packets using the new transmission configuration including the new set of values for the parameter pair $\{\xi, \delta\}$.

Sparse Block Code Based Indirect Carrier Modulation

In ICM transmission systems, the performance of the UL is coupled to the DL via energy harvesting functionality. For example, backscattering transponders (e.g. RFID) transmit data on the UL while at the same time harvesting energy on the DL using the same RF carrier. The use of sparse block codes for the UL can improve the DL energy harvesting efficiency if transmission muting is used to represent the '0' entries of the code.

FIGS. 8A-8C illustrate an example of a sparse block code, FIG. 8A, and the associated carrier modulation scheme, where n bits of data are packed into each symbol and each symbol is represented by a sequence of $N=2^n$ code bits. In FIG. 8A, n=2 and N=4. The code representing each data symbol contains only one non-zero entry.

A general description of the ICM state transitions associated with the code sequences is illustrated in FIG. 8B. The '0' entries in the code are represented by configuring the ICM to state S0. The load attached to the antenna can be configured to match the antenna impedance (e.g. 50 Ohm) when the ICM is configured to state S0 as shown in FIG. 8B. The RF carrier can be fully absorbed when the ICM is in state S0. Therefore, during the transmission of the '0' entries in the code, all or most of the incident RF energy can be absorbed, which can result in maximum DL energy harvesting efficiency, referred to as transmission muting. The ICM transitions from e.g. state S0 to S1 when transmitting the '1' entry in the code. State S1 in FIG. 8B represents a short circuit and, therefore, the incident RF energy is reflected. Thus, during the transmission of the '1' entries in the code, all of the incident RF energy can be reflected, resulting in maximum transmitted energy.

FIG. 8C illustrates a time domain description of the transmitted waveforms corresponding to each of the $\{n=2, N=4\}$ sparse block codes. The DL energy harvesting efficiency is defined as the portion of the incident RF energy that is harvested and stored in the transponder's battery. The normalized energy harvesting efficiency of the DL is $\eta = E_H / E_0$ where $E_0$ is the available incident energy and $E_H$ is the harvested energy. The harvested energy $E_H$ is $$E_H = T_C P_{IN} \Sigma_{k=0}^{N-1} (1 - \Gamma_k) \qquad \text{(Equation 5)}$$

where $T_C$ is the time duration of each element in the sparse block code and $\Gamma_k$ are the power reflectance coefficients associated with the ICM state used to represent each code entry. It is noted that for the example illustrated in FIG. 8B, $\Gamma = 0$ for S0 and $\Gamma = 1$ for S1 and $E_H = 3 T_C P_{IN}$. $E_0$ is computed assuming that the ICM remains is state S0 ($\Gamma = 0$) for all four of the code entries and therefore $E_0 = 4 T_C P_{IN}$ and the normalized energy harvesting efficiency $\eta = 75\%$. A similar approach can be used to determine the transmitted energy per symbol ETX as $$E_{TX} = T_C P_{IN} \Sigma_{k=0}^{N-1} \Gamma_k \qquad \text{(Equation 6)}$$

For the example illustrated in FIG. 8B, $\Gamma = 0$ for S0 and $\Gamma = 1$ for S1 and $E_{TX} = T_C P_{IN}$.

Figures 20A, 20B, 21A, 21B, 22:
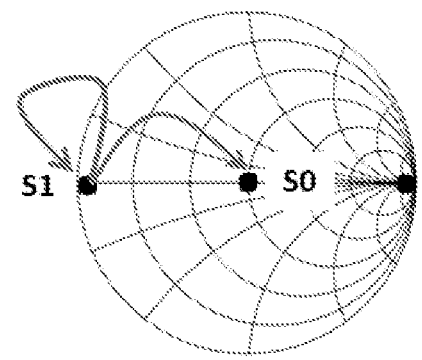
FIGS. 20A and 20B illustrate sparse block coding scheme embodiments.
FIGS. 21A and 21B illustrate an example of a dense block code and the associated carrier modulation scheme.
FIG. 22 illustrates a time domain description of transmitted waveforms corresponding to certain dense block codes.

Two alternative embodiments of a sparse block coding scheme are illustrated in FIGS. 20A and 20B. FIG. 20A illustrates a code implementing maximum sparsity (code rate=½) delivering DL energy harvesting efficiency $\eta = 75\%$ and transmitted UL energy per symbol $E_{TX} = T_C P_{IN}$. FIG. 20B illustrates a rate=⅖ sparse block code delivering DL energy harvesting efficiency $\eta = 60\%$ and transmitted UL energy per symbol $E_{TX} = (\textit{⅖}) T_C P_{IN}$.

Flexible coding schemes can be needed for indirect carrier modulation transmission that introduce multiple degrees of freedom such that a tradeoff between DL energy harvesting and UL reliability can be made as required by different use cases and deployment scenarios. A general description of how this tradeoff can be achieved using sparse block codes is outlined hereafter.

A device can increase the sparsity level or equivalently the rate of a sparse block code to increase the DL energy harvesting efficiency.

Conversely, a device can reduce the sparsity level or equivalently the rate of a sparse block code to increase the transmitted energy per UL symbol and hence UL reliability.

Figures 9A, 9B, 9C:
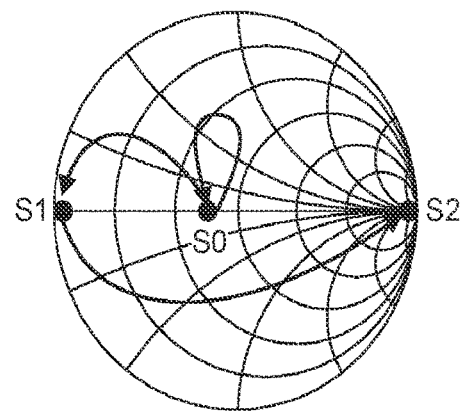
FIGS. 9A-9C illustrate sparse block code according to an embodiment of the present principles.

The reliability of a UL employing sparse-block-code-based ICM transmission can be improved by introducing additional degrees of freedom to the sparse block coding based indirect carrier modulation scheme. FIGS. 9A-9C illustrate sparse block code according to an embodiment of the present principles. FIG. 9A illustrates the coding scheme and FIG. 9 the ICM state transitions.

Generally speaking, according to the embodiment, a UE uses phase reversals in the RF carrier to represent non-zero entries in sparse block codes and transmits the phase reversal in a data encoding sequence using transitions between a pair of antipodal reflectance states $\{S1, S2\}$ in the ICM. The reliability of the transmission can be improved by mapping the antipodal reflectance states of the ICM to open and short terminations of the antenna. The UE can use one of the reflectance states from an antipodal pair to transmit a reference phase for phase-coherent indirect carrier modulated transmission, and can use directional transitions between a pair of antipodal reflectance states {S1, S2} to indicate phase reversal direction change.

The '0' entries in the code can be represented by configuring the ICM to state S0. The ICM can transition from state S0 to S1 and then to S2 when transmitting the '1' entry in the code. State S1 in FIG. 9B can represent a short circuit and state S2 can represent an open circuit. Both states S1 and S2 can reflect all of the incident RF energy but the transition from state S1 to S2 results in a carrier phase reversal. FIG. 9C illustrates the time domain description of the transmitted waveforms corresponding to each of the {n=2, N=4} sparse block codes.

It is noted that for a first order the harvesting efficiency $\eta$ and the transmitted energy per symbol $E_{TX}$ are the same for the two approaches described in FIGS. 8A-8C and FIGS. 9A-9C. However, the transmission scheme described in FIGS. 9A-9C can improve the reliability of the UL by introducing an additional degree of freedom by the introduction of a phase reversal in the middle of the sinusoidal wave packet representing the '1' entry in the sparse block code. The UE can then use a decoder that employs both an amplitude and phase detector. The power consumption of the load modulator in the UE's transponder is expected to increase since it executes 3 state transitions in the antenna load instead of 2 while transmitting the '1' entry in the sparse block code, which can slightly reduce the overall energy-efficiency of the of the UE.

Dense Block Code Based Indirect Carrier Modulation

In indirect carrier modulation transmission systems, the performance of the UL is coupled to the DL via energy harvesting functionality. For example, backscattering transponders (e.g. RFID) transmit data on the UL while at the same time harvesting energy on the DL using the same RF carrier. Using dense block codes where a perfect-reflectance state (e.g. S1 in FIG. 21B illustrating ICM state transitions) is used to represent the '1' entries of the dense block code can improve the UL reliability by increasing the transmitted energy per symbol. An example of a dense block code and the associated carrier modulation scheme is illustrated in FIGS. 21A and 21B where n bits of data are packed into each symbol and each symbol is represented by a sequence of N=2n code bits. In FIG. 21A, n=2 and N=4. The code representing each data symbol contains only one zero entry.

A general description of the ICM state transitions associated with the code sequences is illustrated in FIG. 21B. The '0' entries in the code are represented by configuring the ICM to state S0. The load attached to the antenna is configured to match the antenna impedance (e.g. 50 Ohm) when the ICM is configured to state S0 as shown in FIG. 21B. The RF carrier is fully absorbed when the ICM is in state S0. Therefore, during the transmission of the '0' entries in the code, all or most of the incident RF energy is absorbed. The ICM transitions from e.g. state S0 to S1 when transmitting the '1' entry in the code. State S1 in FIG. 21B represents a short circuit and therefore, all of the incident RF energy is reflected. Therefore, during the transmission of the '1' entries in the code, all of the incident RF energy is reflected resulting in maximum transmitted energy.

Time domain description of the transmitted waveforms corresponding to each of the {n=2, N=4} dense block codes are illustrated in FIG. 22. The DL energy harvesting efficiency is defined as the portion of the incident RF energy that is harvested and stored in the transponder's battery. The normalized energy harvesting efficiency of the DL is $\eta=E_H/E_0$ where $E_0$ is the available incident energy and $E_H$ is the harvested energy. The harvested energy $E_H$ is defined as $$E_H = T_C P_{IN} \Sigma_{k=0}^{N-1}(1-\Gamma_k) \quad \text{(Equation 7)}$$

$T_C$ is the time duration of each element in the dense block code and $\Gamma_k$ are the power reflectance coefficients associated with the ICM state used to represent each code entry. For the example illustrated in FIG. 21B, $\Gamma=0$ for $S_0$ and $\Gamma=1$ for $S_1$ and $E_H=T_C P_{IN}$. $E_0$ is computed assuming that the ICM remains is state $S_0$ ($\Gamma=0$) for all four of the code entries and therefore $E_0=4T_C P_{IN}$ and the normalized energy harvesting efficiency $\eta=25\%$. A similar approach can be used to determine the transmitted energy per symbol $E_{TX}$ as $$E_{TX} = T_C P_{IN} \Sigma_{k=0}^{N-1}\Gamma_k \quad \text{(Equation 8)}$$

For the example illustrated in FIG. 21B, $\Gamma=0$ for $S_0$ and $\Gamma=1$ for $S_1$ and $E_{TX}=(\frac{3}{4})T_C P_{IN}$.

Figures 23A, 23B, 24:
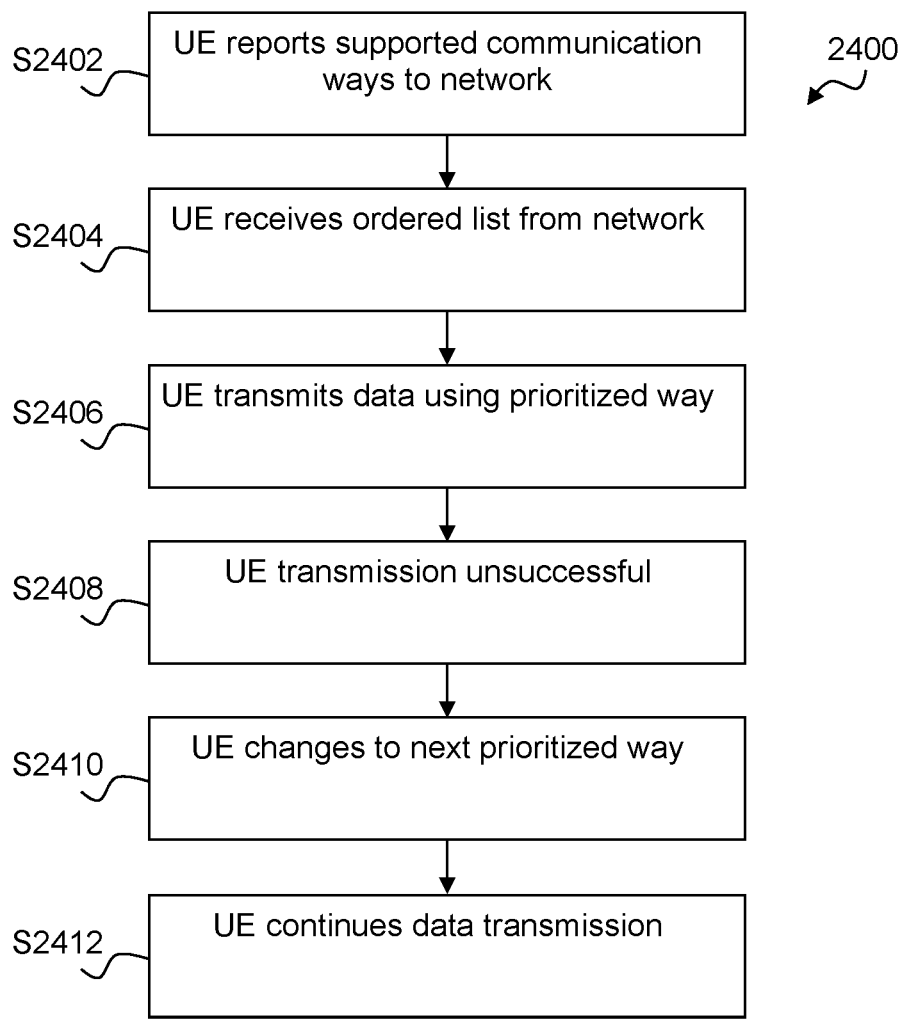
FIGS. 23A and 23B illustrate dense block coding scheme embodiments.
FIG. 24 illustrates a further embodiment of a method according to the present principles.

Two alternative embodiments of a dense block coding scheme are illustrated in FIGS. 23A and 23B. FIG. 23A illustrates a code implementing maximum density (code rate=½) delivering DL energy harvesting efficiency $\eta=25\%$ and transmitted UL energy per symbol $E_{TX}=(\frac{3}{4})T_C P_{IN}$. FIG. 23B illustrates a rate=⅖ dense block code delivering DL energy harvesting efficiency $\eta=40\%$ and transmitted UL energy per symbol $E_{TX}=(\frac{3}{5})T_C P_{IN}$.

Flexible coding schemes can be needed for indirect carrier modulation transmission that introduce multiple degrees of freedom such that a tradeoff between DL energy harvesting and UL reliability can be made as required by different use cases and deployment scenarios. A general description of how this tradeoff can be achieved using dense block codes is outlined hereafter.

A device can increase the density level or equivalently the rate of a dense block code to increase the transmitted energy per UL symbol and hence UL reliability. Conversely, a device can reduce the density level or equivalently the rate of a dense block code to increase the DL energy harvesting efficiency.

UE Procedures

As already explained, a UE can concurrently receive power and transmit information on the same RF carrier. The UE can act to enable concurrent efficient DL energy harvesting (EH) and reliable UL data transmission in ICM transmission systems. The desired EH/UL-reliability tradeoff can be obtained by determining a constellation type (e.g. ICM, Hybrid Phase-Amplitude ICM, Sparse Block Code ICM, Dense Block Code ICM) for a corresponding modulation order (i.e. a specific number of constellation points) and selecting the constellation/symbol configuration that optimizes DL EH efficiency for a specified UL transmission reliability. This can, broadly speaking, be network-controlled or UE controlled.

Figure 10:
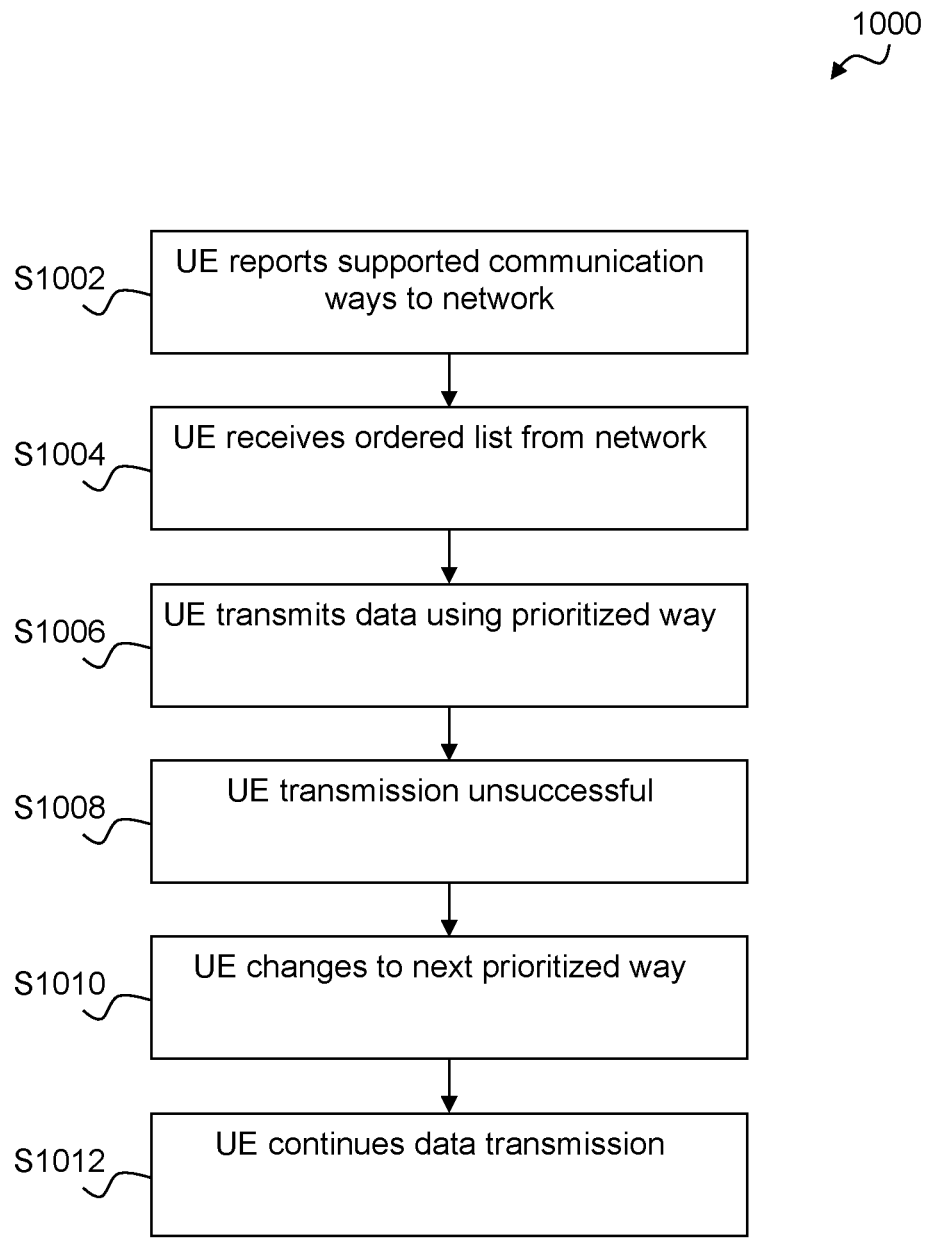
FIG. 10 illustrates an embodiment of a method according to of the present principles.

In an embodiment of a method 1000 according to the present principles, illustrated in FIG. 10, the UE can perform constellation adaptation after a data re-transmission request from the network.

In step S1002, the UE utilizes a mandatory standardized modulation type/order with specific constellation/symbol configuration to report its supported class(es) or list of supported modulation type(s)/order(s) and corresponding constellation/symbol configuration to the network.

In step S1004, the UE receives a priority order or ranking for the reported list of modulation and constellation configuration (for each modulation order), wherein a default constellation type (i.e. with highest priority) is one that delivers highest supported DL energy harvesting efficiency, and a lowest priority constellation is one that delivers the highest UL transmitted energy per bit for a given modulation order.

In step S1006, the UE transmits data using the highest priority constellation delivering the highest supported DL energy harvesting efficiency.

In step S1008, the UE receives a data re-transmission request or fails to receive an ACK within a pre-specified time window for a consecutive specified signaled/preconfigured number of times.

In step S1010, the UE switches to the next configured constellation and modulation type on the priority list to re-transmit the data.

In step S1012, the UE continues data transmission using the selected constellation and modulation type as long as it does not receive a re-transmission request or receives ACKs, cf. step S1008. Otherwise, it repeats step S1010 until the priority list is exhausted or an overall signaled/preconfigured aggregate number of retransmissions is achieved, at which point the UE declares a data transmission/connection failure.

The default (i.e. highest priority) constellation configuration in step S1004 can utilize the zero-reflectance state of the ICM as a point in the UL signal constellation for efficient DL EH, can be a hybrid phase-amplitude indirect carrier modulation scheme with the lowest supported duty cycle factor and the highest supported modulation depth for efficient DL EH, or can be a sparse block code based indirect carrier modulation scheme with maximum number of supported zero-reflectance states per code.

The lowest priority constellation in step S1004 can be a hybrid phase-amplitude indirect carrier modulation scheme with the highest supported duty cycle factor and the lowest supported modulation depth, or a sparse block code based indirect carrier modulation scheme including a phase reversal in the sinusoidal wave packet representing the non-zero code entries.

In the method illustrated in FIG. 10, the UE makes the decision on which modulation type/order and associated constellation configuration to be used based on assisting information from the network in the form of priority/ranking list.

Figure 11:
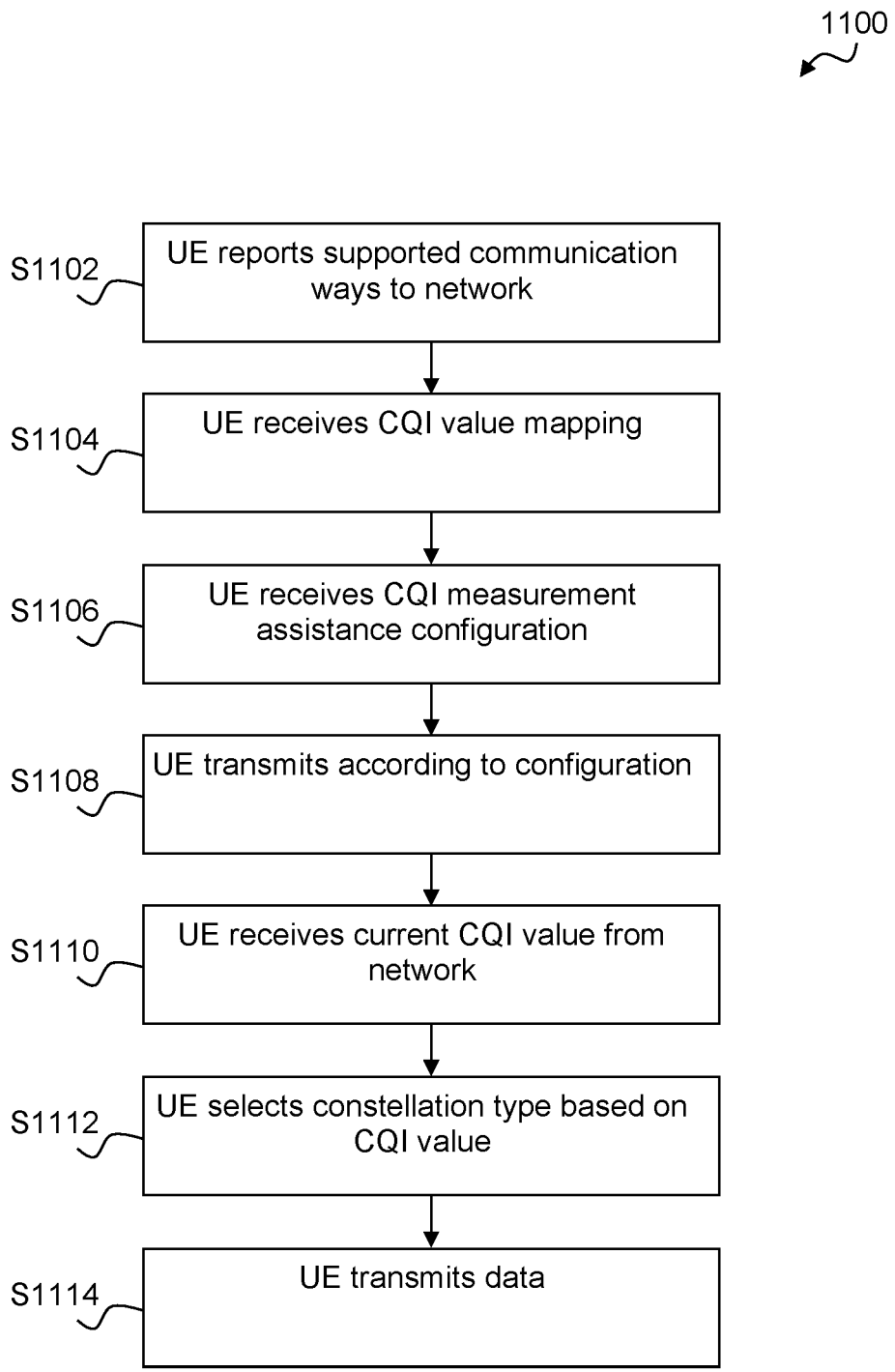
FIG. 11 illustrates a further embodiment of a method according to of the present principles.

FIG. 11 illustrates a method 1100 according to an embodiment of the present principles in which the UE has full control of which modulation type/order and constellation configuration to be used without any assisting information from the network. It is assumed that the network is capable of blindly detecting which transmission configuration has been utilized for data transmission by the UE. In this embodiment, the UE can perform constellation adaptation based on Channel-Quality Indicator (CQI) measurements reported by the network.

In step S1102, the UE utilizes a mandatory standardized modulation type/order with specific constellation/symbol configuration to report its supported class(es) or list of supported modulation type(s)/order(s) and corresponding receiving constellation/symbol configuration for each supported modulation type.

In step S1104, the UE receives a mapping between CQI values and modulation type(s)/order(s) and corresponding constellation/symbol configuration based on the reported values.

In step S1106, the UE receives CQI measurement assistance configuration, e.g. a unique ID, periodicity of the unique ID transmission occasions, and modulation type/order and constellation/symbol configuration.

In step S1108, the UE utilizes the signaled modulation type/order and constellation/symbol configuration to transmit, e.g. periodically, the configured unique ID and facilitates CQI measurement by the network.

In step S1110, the UE receives a current measured CQI value ($Q_i$) from the network periodically or conditional on $Q_i$ satisfying the following relationship $|Q_i-f(\{Q_j\}_{j \in \{i-N, i-N+1, \ldots i-1\}})|>\delta$ where $f(\bullet)$ is a function of the last N measurements.

In step S1112, the UE selects the constellation type from the pre-configured list based on the CQI value reported by the network and preconfigured mapping.

In step S1114, the UE continues data transmission using the selected modulation type/order and constellation configuration.

Figure 12:
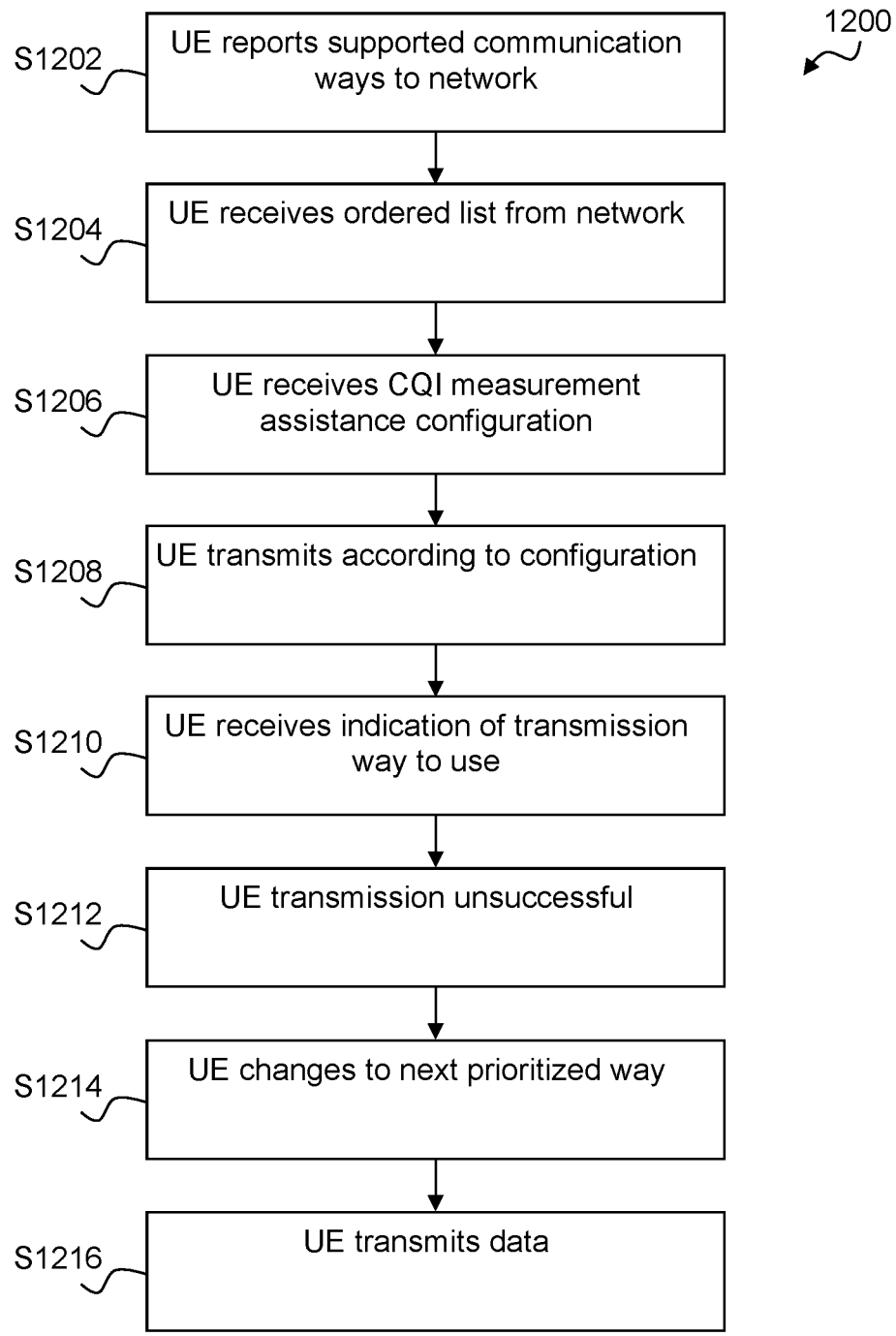
FIG. 12 illustrates a further embodiment of a method according to of the present principles.

FIG. 12 illustrates a method 1200 according to an embodiment of the present principles in which the UE performs constellation adaptation based on a constellation type configuration received from the network.

In step S1202, the UE utilizes a mandatory standardized modulation type/order with specific constellation/symbol configuration to report its supported class(es) or list of supported modulation type(s)/order(s) and corresponding constellation/symbol configuration.

In step S1204, the UE receives a priority order or ranking for the reported list of modulation and constellations configuration (for each modulation order), in which a default constellation type (highest priority) can be one that delivers highest supported DL energy harvesting efficiency, and a lowest priority constellation can be one that delivers the highest UL transmitted energy per bit for a given modulation order.

In step S1206, the UE receives a CQI measurement occasion configuration to facilitate CQI measurements by the network, e.g. a unique ID, modulation type/order, and constellation/symbol configuration.

In step S1208, the UE utilizes the signaled modulation type/order and constellation/symbol configuration to transmit the configured unique ID at the assigned measurement occasion.

In step S1210, the UE receives a priority value from the network indicating the modulation type/order and constellation configuration to be initially utilized for data transmission.

In step S1212, the UE receives data re-transmission request or fails to receive an ACK within a pre-specified time window for a consecutive specified signaled/preconfigured number of times.

In step S1214, the UE switches to the next configured constellation and modulation type on the priority list to re-transmit the data.

In step S1216, the UE continues data transmission using the selected constellation and modulation type as long as it does not receive a re-transmission request or fails to receive an ACK, cf. step S1212. Otherwise, it repeats step S1214 until the priority list is exhausted or an overall signaled/preconfigured aggregate number of retransmissions is achieved, at which point it declares data transmission/connection failure. The method can return to step S1206.

The default (highest priority) constellation configuration, cf. step S1204, can utilize the zero-reflectance state of the ICM as a point in the UL signal constellation for efficient DL EH, be a hybrid phase-amplitude indirect carrier modulation scheme with the lowest supported duty cycle factor and the highest supported modulation depth for efficient DL EH, or be sparse block code based indirect carrier modulation scheme with maximum number of supported zero-reflectance states per code.

The lowest priority constellation, cf. step S1204, can be a hybrid phase-amplitude indirect carrier modulation scheme with the highest supported duty cycle factor and the lowest supported modulation depth, or be a sparse block code based indirect carrier modulation scheme including a phase reversal in the sinusoidal wave packet representing the non-zero code entries.

Figure 13:
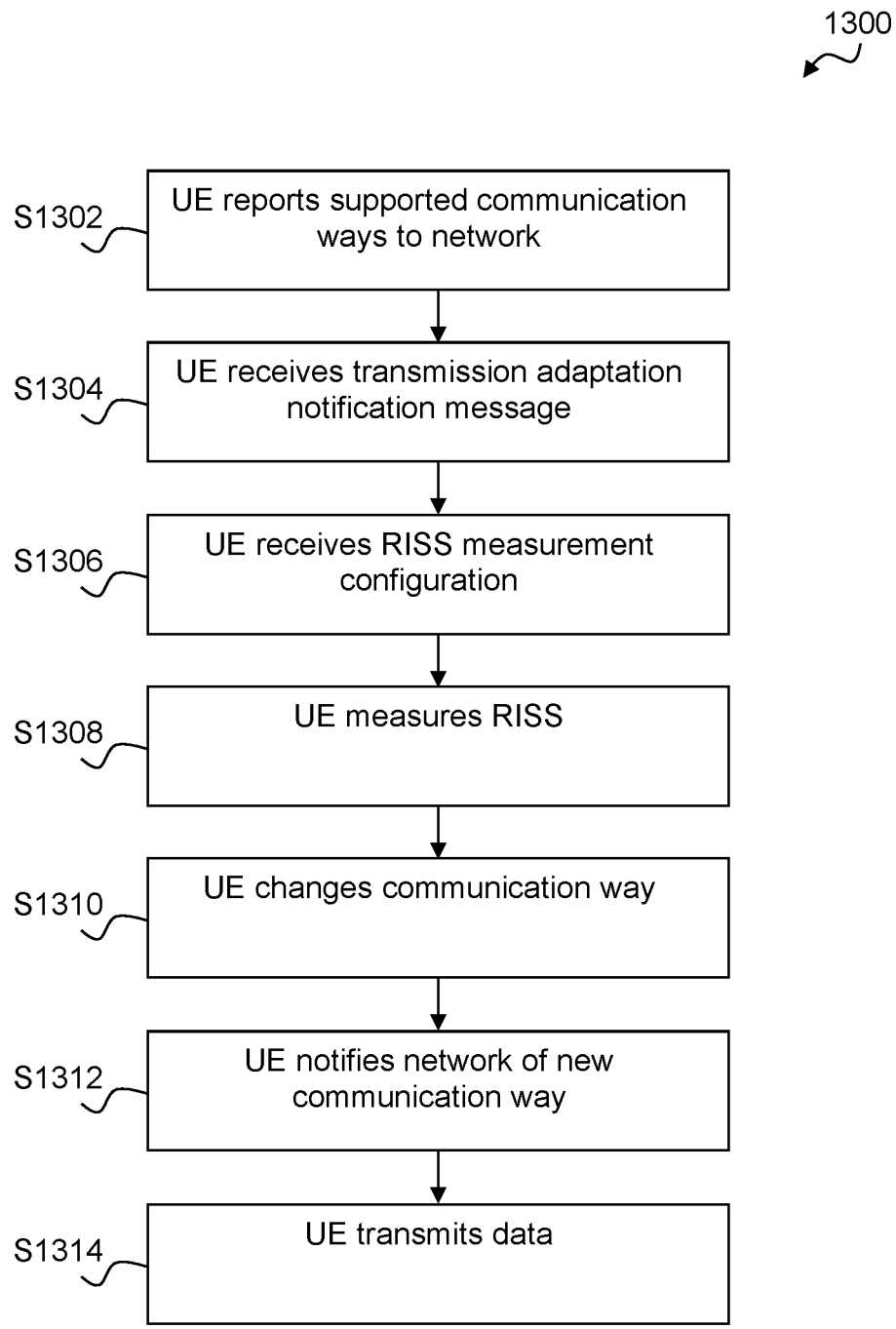
FIG. 13 illustrates a further embodiment of a method according to of the present principles.

FIG. 13 illustrates a method 1300 according to an embodiment of the present principles in which the UE performs constellation adaptation based on an the evaluation of a performance indicator.

In step S1302, the UE utilizes a mandatory standardized modulation type/order with specific constellation/symbol configuration to report its supported class(es) or list of supported modulation type(s)/order(s) and corresponding constellation/symbol configuration.

In step S1304, the UE receives a transmission adaptation notification message configuration, e.g. periodicity of transmission or triggering criteria and associated parameters, modulation type/order, and constellation configuration.

In step S1306, the UE receives a configuration of occasions for measuring a received interrogation signal strength (RISS), e.g. type of occasion (standalone measurement occasion or non-standalone, i.e. resources are used for both measurement and UL data transmission), periodicity of occasions, modulation type/order and constellation configuration associated with UL transmissions in non-standalone occasions.

In step S1308, the UE measures RISS over one or more measurement occasions and determines the DL energy harvesting efficiency (q) associated with current UL transmission configuration.

In step S1310, the UE receives a data re-transmission request from the network or a notification from its Power Management Unit (PMU) and selects a new constellation from a list of pre-specified UL constellation types such that the performance indicators $(E_H - E^{TX}) = \{\eta RISS - P_{ICM}\}$ $(N/R) > \delta$ and $E_{TX} > \Delta$ where $P_{ICM}$ is the power consumption of the ICM when configured for the new constellation, N is the UL data packet size, R the UL data rate, $E_{TX}$ is the UL transmitted energy per symbol and $\delta$, $\Delta$ are optimization goals that might be preconfigured at the UE or signaled by the network as part of triggering criteria.

In step S1312, the UE uses the preconfigured/signaled transmission configuration and transmits a transmission adaptation notification message indicating the newly selected transmission configuration to be used in the following UL data packets.

In step S1314, the UE transmits UL data packets using the new transmission configuration.

In an embodiment of a method 2400 according to the present principles, illustrated in FIG. 24, the UE can perform constellation adaptation after a data re-transmission request from the network.

In step S2402, the UE utilizes a mandatory standardized modulation type/order with specific constellation/symbol configuration to report its supported class(es) or list of supported modulation type(s)/order(s) and corresponding constellation/symbol configuration to the network.

In step S2404, the UE receives a priority order or ranking for the reported list of modulation and constellation configuration (for each modulation order), wherein a default constellation type (i.e. with highest priority) is one that delivers highest supported DL energy harvesting efficiency, and a lowest priority constellation is one that delivers the highest UL transmitted energy per bit for a given modulation order.

In step S2406, the UE transmits data using the highest priority constellation delivering the highest supported DL energy harvesting efficiency.

In step S2408, the UE receives a data re-transmission request or fails to receive an ACK within a pre-specified time window for a consecutive specified signaled/preconfigured number of times.

In step S2410, the UE switches to the next configured constellation and modulation type on the priority list to re-transmit the data.

In step S2412, the UE continues data transmission using the selected constellation and modulation type as long as it does not receive a re-transmission request or receives ACKs, cf. step S1008. Otherwise, it repeats step S2410 until the priority list is exhausted or an overall signaled/preconfigured aggregate number of retransmissions is achieved, at which point the UE declares a data transmission/connection failure.

The default (highest priority) constellation configuration for e.g. passive devices in step S2404 can utilize the zero-reflectance state of the ICM as a point in the UL signal constellation for efficient DL EH.

The default (highest priority) constellation configuration for e.g. passive devices in step S2404 can be a hybrid phase-amplitude indirect carrier modulation scheme with the lowest supported duty cycle factor and the highest supported modulation depth for efficient DL EH.

The default (highest priority) constellation configuration for e.g. passive devices in step S2404 can be a sparse block code based indirect carrier modulation scheme with maximum number of supported zero-reflectance states per code (i.e. maximum sparsity, highest code rate).

The default (highest priority) constellation configuration for e.g. passive devices in step S2404 can be a dense block code based indirect carrier modulation scheme with maximum number of supported zero-reflectance states per code (i.e. minimum density, lowest code rate).

The lowest priority constellation for e.g. passive devices in step S2404 can be a hybrid phase-amplitude indirect carrier modulation scheme with the highest supported duty cycle factor and the lowest supported modulation depth.

The lowest priority constellation configuration for e.g. passive devices in step S2404 can be a dense block code based indirect carrier modulation scheme with maximum number of supported perfect-reflectance states per code (i.e. maximum density, highest code rate).

The lowest priority constellation configuration for e.g. passive devices in step S2404 can be sparse block code based indirect carrier modulation scheme with maximum number of supported perfect-reflectance states per code (i.e. minimum sparsity, lowest code rate).

The lowest priority constellation for e.g. passive devices in step S2404 can be a sparse block code based indirect carrier modulation scheme including a phase reversal in the sinusoidal wave packet representing the non-zero code entries.

In the method illustrated in FIG. 24, the UE makes the decision on which modulation type/order and associated constellation configuration to be used based on assisting information from the network in the form of priority/ranking list.

Figure 25:
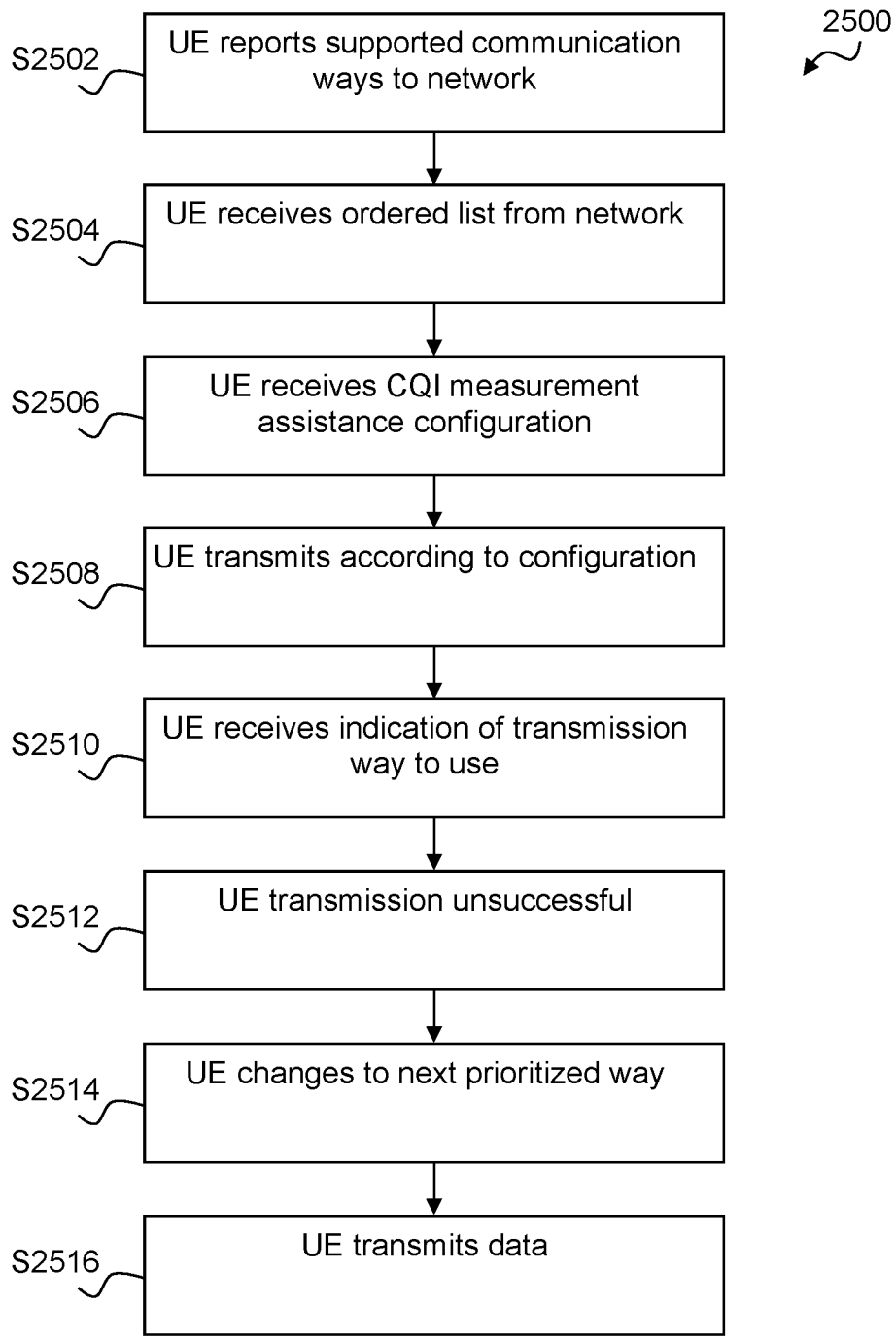
FIG. 25 illustrates a further embodiment of a method according to the present principles.

FIG. 25 illustrates a method 2500 according to an embodiment of the present principles in which the UE performs constellation adaptation based on a constellation type configuration received from the network.

In step S2502, the UE utilizes a mandatory standardized modulation type/order with specific constellation/symbol configuration to report its supported class(es) or list of supported modulation type(s)/order(s) and corresponding constellation/symbol configuration.

In step S2504, the UE receives a priority order or ranking for the reported list of modulation and constellations configuration (for each modulation order).

The order or ranking can include a default modulation/constellation type (highest priority) suitable for e.g. battery-less passive devices that delivers the highest supported DL energy harvesting efficiency. Alternatively, the order or ranking can include a default modulation/constellation type (highest priority) suitable for e.g. active devices with an on-board battery that delivers the highest UL transmitted energy per bit for a given modulation order.

The order or ranking can include a lowest priority constellation suitable for e.g. battery-less passive devices that delivers the highest UL transmitted energy per bit for a given modulation order. Alternatively, the order or ranking can include a lowest priority constellation suitable for e.g. active devices with an on-board battery that delivers the highest supported DL energy harvesting efficiency.

In step S2506, the UE receives a CQI measurement occasion configuration to facilitate CQI measurements by the network, e.g. a unique ID, modulation type/order, and constellation/symbol configuration.

In step S2508, the UE utilizes the signaled modulation type/order and constellation/symbol configuration to transmit the configured unique ID at the assigned measurement occasion.

In step S2510, the UE receives a priority value from the network indicating the modulation type/order and constellation configuration to be initially utilized for data transmission.

In step S2512, the UE receives data re-transmission request or fails to receive an ACK within a pre-specified time window for a consecutive specified signaled/preconfigured number of times.

In step S2514, the UE switches to the next configured constellation and modulation type on the priority list to re-transmit the data.

In step S2516, the UE continues data transmission using the selected constellation and modulation type as long as it does not receive a re-transmission request or fails to receive an ACK, cf. step S2512. Otherwise, it repeats step S2514 until the priority list is exhausted or an overall signaled/preconfigured aggregate number of retransmissions is achieved, at which point it declares data transmission/connection failure. The method can return to step S2506.

The default (highest priority) constellation configuration for e.g. passive devices, cf. step S2504, can utilize the zero-reflectance state of the ICM as a point in the UL signal constellation for efficient DL EH, be a hybrid phase-amplitude indirect carrier modulation scheme with the lowest supported duty cycle factor and the highest supported modulation depth for efficient DL EH, be a sparse block code based indirect carrier modulation scheme with maximum number of supported zero-reflectance states per code (i.e. maximum sparsity, highest code rate), or be a dense block code based indirect carrier modulation scheme with maximum number of supported zero-reflectance states per code (i.e. minimum density, lowest code rate).

The lowest priority constellation for e.g. passive devices, cf. step S2504, can be a hybrid phase-amplitude indirect carrier modulation scheme with the highest supported duty cycle factor and the lowest supported modulation depth, a dense block code based indirect carrier modulation scheme with maximum number of supported perfect-reflectance states per code (i.e. maximum density, highest code rate), a sparse block code based indirect carrier modulation scheme with maximum number of supported perfect-reflectance states per code (i.e. minimum sparsity, lowest code rate), or a sparse block code based indirect carrier modulation scheme including a phase reversal in the sinusoidal wave packet representing the non-zero code entries.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for operation by a wireless transmit/receive unit, WTRU, the method comprising:
   selecting a constellation from a set of constellations corresponding to a symbol configuration for indirect carrier modulation, ICM, based on at least one constellation performance efficacy indicator, each constellation performance efficacy indicator respectively corresponding to a constellation of the set of constellations; and
   using the selected constellation, simultaneously harvesting energy and transmitting data.

2. The method of claim 1, further comprising evaluating at least one of the constellation performance efficacy indicators based on downlink energy harvesting, DL EH, efficiency and uplink, UL, data transfer reliability for the corresponding constellation.

3. The method of claim 2, further comprising measuring a received signal strength and the downlink energy harvesting efficiency.

4. The method of claim 2, wherein a constellation performance efficacy indicator comprises at least one quantity of $\eta$RISS, PICM and ETX and wherein the constellation is selected in a manner that the at least one quantity comprised in the constellation performance efficacy indicator satisfies a respective condition $\eta$RISS>$\varepsilon$PICM <$\theta$, and ETX>$\Delta$ where $\eta$ is the energy harvesting efficiency, RISS is the measured received signal strength, PICM is a power consumption of the ICM, ETX is an uplink transmitted energy per symbol and $\theta$, $\varepsilon$, and $\Delta$ are goal values.

5. The method of claim 4, wherein the constellation is selected in a manner that ($\eta$RISS−PICM)(N/R) >$\delta$ and a second efficacy indicator ETX>$\Delta$, where N is an uplink data packet size, R is an uplink data rate and $\delta$ is a goal value.

6. The method of claim 1, further comprising selecting the symbol configuration.

7. The method of claim 1, further comprising transmitting an indication of the selected constellation and symbol configuration.

8. The method of claim 1, wherein the constellation defines an arrangement of constellation points.

9. The method of claim 1, wherein the symbol configuration defines a number of bits per symbol.

10. The method of claim 1, wherein the constellation is determined by indirect carrier modulator impedance states.

11. A wireless transmit/receive unit, WTRU, comprising:
an antenna;
an energy harvester; and
at least one hardware processor configured to select a constellation from a set of constellations corresponding to a symbol configuration for indirect carrier modulation, ICM, based on at least one constellation performance efficacy indicator, each constellation performance efficacy indicator respectively corresponding to a constellation of the set of constellations;
wherein the selected constellation is used to simultaneously harvest energy using the energy harvester and transmit data using the antenna.

12. The WTRU of claim 11, wherein the at least one hardware processor is further configured to evaluate at least one of the constellation performance efficacy indicators based on downlink energy harvesting, DL EH, efficiency and uplink, UL, data transfer reliability for the corresponding constellation.

13. The WTRU of claim 12, wherein the at least one hardware processor is further configured to measure a received signal strength and the downlink energy harvesting efficiency.

14. The WTRU of claim 12, wherein a constellation performance efficacy indicator comprises at least one quantity of $\eta$RISS, PICM and ETX and wherein the at least one hardware processor is configured to select the constellation in a manner that the at least one quantity comprised in the constellation performance efficacy indicator satisfies a respective condition $\eta$RISS $>\varepsilon$, PICM$<\theta$, and ETX$>\Delta$, where $\eta$ is the energy harvesting efficiency, RISS is the measured received signal strength, PICM is a power consumption of the ICM, ETX is an uplink transmitted energy per symbol and $\theta$, $\varepsilon$, and $\Delta$ are goal values.

15. The WTRU of claim 14, wherein the at least one hardware processor is configured to select the constellation in a manner that $(\eta\text{RISS}-\text{PICM})(N/R)>\delta$ and a second efficacy indicator ETX$>\Delta$, where N is an uplink data packet size, R is an uplink data rate and $\delta$ is a goal value.

16. The WTRU of claim 11, wherein the at least one hardware processor is further configured to select the symbol configuration.

17. The WTRU of claim 11, wherein the at least one hardware processor is further configured to transmit, through the antenna, an indication of the selected constellation and symbol configuration.

18. The WTRU of claim 11, wherein the constellation defines an arrangement of constellation points.

19. The WTRU of claim 11, wherein the symbol configuration defines a number of bits per symbol.

20. The WTRU of claim 11, wherein the constellation is determined by indirect carrier modulator impedance states.

\* \* \* \* \*